(12) United States Patent
Jia et al.

(10) Patent No.: US 11,263,747 B2
(45) Date of Patent: Mar. 1, 2022

(54) DETECTING AVASCULAR AREAS USING NEURAL NETWORKS

(71) Applicant: Oregon Health & Science University, Portland, OR (US)

(72) Inventors: Yali Jia, Portland, OR (US); Yukun Guo, Portland, OR (US)

(73) Assignee: Oregon Health & Science University, Portland, OR (US)

( * ) Notice: Subject to any disclaimer, the term of this patent is extended or adjusted under 35 U.S.C. 154(b) by 13 days.

(21) Appl. No.: 16/858,384

(22) Filed: Apr. 24, 2020

(65) Prior Publication Data

US 2020/0342595 A1    Oct. 29, 2020

Related U.S. Application Data

(60) Provisional application No. 62/839,317, filed on Apr. 26, 2019.

(51) Int. Cl.
   *G06K 9/00*    (2006.01)
   *G06T 7/00*    (2017.01)
   *G06T 9/00*    (2006.01)

(52) U.S. Cl.
   CPC ............ *G06T 7/0012* (2013.01); *G06T 9/002* (2013.01); *G06T 2207/10101* (2013.01); *G06T 2207/20021* (2013.01); *G06T 2207/20024* (2013.01); *G06T 2207/20081* (2013.01); *G06T 2207/20084* (2013.01); *G06T 2207/20221* (2013.01); *G06T 2207/30041* (2013.01); *G06T 2211/404* (2013.01)

(58) Field of Classification Search
   CPC . G06T 7/0012; G06T 9/002; G06T 2211/404; G06T 2207/30041; G06T 2207/20024; G06T 2207/20081; G06T 2207/20084; G06T 2207/20021; G06T 2207/20221; G06T 2207/10101; G06N 3/0454; G06N 3/08
   USPC ........................................................ 382/156
   See application file for complete search history.

(56) References Cited

U.S. PATENT DOCUMENTS

2017/0039689 A1    2/2017    Solanki et al.
2018/0132725 A1    5/2018    Vogl et al.

OTHER PUBLICATIONS

Guo, Yukun, et al. "MEDnet, a neural network for automated detection of avascular area in OCT angiography." Biomedical optics express 9.11 (2018): 5147-5158. (Year: 2018).*

(Continued)

*Primary Examiner* — Jonathan S Lee
(74) *Attorney, Agent, or Firm* — Katherine M. Mead; Tanya Harding; Lee & Hayes, P.C.

(57) ABSTRACT

An example method includes generating, using a multi-scale block of a convolutional neural network (CNN), a first output image based on an optical coherence tomography (OCT) reflectance image of a retina and an OCT angiography (OCTA) image of the retina. The method further includes generating, using an encoder of the CNN, at least one second output image based on the first output image and generating, using a decoder of the CNN, a third output image based on the at least one second output image. An avascular map is generated based on the third output image. The avascular map indicates at least one avascular area of the retina depicted in the OCTA image.

20 Claims, 11 Drawing Sheets
(5 of 11 Drawing Sheet(s) Filed in Color)

(56) References Cited

OTHER PUBLICATIONS

Hassan, Taimur, et al. "Deep learning based automated extraction of intra-retinal layers for analyzing retinal abnormalities." 2018 IEEE 20th International Conference on e-Health Networking, Applications and Services (Healthcom). IEEE, 2018. (Year: 2018).*

Prentasic, Pavle, et al. "Segmentation of the foveal microvasculature using deep learning networks." Journal of biomedical optics 21.7 (2016): 075008. (Year: 2016).*

Eladawi, Nabila, et al. "Early diabetic retinopathy diagnosis based on local retinal blood vessel analysis in optical coherence tomography angiography (OCTA) images." Medical physics 45.10 (2018): 4582-4599. (Year: 2018).*

Agemy, et al., "Retinal Vascular Perfusion Density Mapping Using Optical Coherence Tomography Angiography in Normals and Diabetic Retinopathy Patients," Retina, vol. 35, No. 11, Nov. 2015, pp. 2353-2363.

Alibhai, et al., "Quantification of Retinal Capillary Nonperfusion in Diabetics Using Wide-Field Dptical Coherence Tomography Angiography," Retina, vol. 40, No. 3, Mar. 2020, pp. 412-420.

Antonetti, et al., "Diabetic Retinopathy," The New England Journal of Medicine, vol. 336, No. 13, Mar. 2012, pp. 1227-1239.

Badrinarayanan, et al., "SegNet A Deep Convolutional Encoder-Decoder Architecture for Image Segmentation," IEEE Transactions on Pattern Analysis and Machine Intelligence, vol. 39, No. 12, Dec. 2017, pp. 2481-2495.

Camino, et al., "Deep learning for the segmentation of preserved photoreceptors on en face optical coherence tomography in two inherited retinal diseases," Biomedical Optics Express, vol. 9, No. 7, Jul. 2018, pp. 3092-3105.

Camino, et al., "Evaluation of artifact reduction in optical coherence tomography angiography with real-time tracking and motion correction technology," Biomedical Optics Express, vol. 7, No. 10, Oct. 2016, pp. 3905-3915.

Camino, et al., "Regression-based algorithm for bulk motion subtraction in optical coherence tomography angiography," Biomedical Optics Express, vol. 8, No. 6, Jun. 2017, pp. 3053-3066.

Chen, et al., "DeepLab: Semantic Image Segmentation with Deep Convolutional Nets, Atrous Convolution, and Fully Connected CRFs," IEEE Transactions on Pattern Analysis and Machine Intelligence, vol. 40, No. 4, Apr. 2018, pp. 834-848.

Chen, et al., "Rethinking Atrous Convolution for Semantic Image Segmentation," ArXiv, Dec. 2017, 14 pages.

Devalla, et al., "DRUNET: a dilated-residual U-Netdeep learning network to segment optic nerve head tissues in optical coherence tomography images," Biomedical Optics Express, vol. 9, No. 7, Jul. 2018, pp. 3244-3265.

Fang, et al., "Automatic segmentation of nine retinal layer boundaries in OCT images of non-exudative AMD patients using deep learning and graph search," Biomedical Optics Express, vol. 8, No. 5, May 2017, pp. 2732-2744.

Gao, et al., "Compensation for Reflectance Variation in Vessel Density Quantification by Optical Coherence Tomography Angiography," Investigative Ophthalmology & Visual Science, vol. 57, No. 10, Aug. 2016, pp. 4485-4492.

Guo, et al., "Development and Validation of a Deep Learning Algorithm for Distinguishing the Nonperfusion Area from Signal Reduction Artifacts on OCT Angiography", Biomedical Optics Express, vol. 10, No. 7, Jul. 1, 2019, pp. 3257-3268.

Guo, et al., "Automated segmentation of retinal layer boundaries and capillary plexuses in wide-field optical coherence tomographic angiography," Biomedical Optics Express, vol. 9, No. 9, Sep. 2018, pp. 4429-4442.

Hamwood, et al., "Effect of patch size and network architecture on a convolutional neural network approach for automatic segmentation of OCT retinal layers," Biomedical Optics Express, vol. 9, No. 7, Jul. 2018, pp. 3049-3066.

He, et al., "Deep Residual Learning for Image Recognition," Computer Vision and Pattern Recognition, Jun. 2016, pp. 770-778.

Huang, et al., "Densely Connected Convolutional Networks," Proceedings of the IEEE Conference on Computer Vision and Pattern Recognition, Jul. 2017, pp. 4700-4708.

Hussain, et al., "Diametric measurement of foveal avascular zone in healthy young adults using optical coherence tomography angiography," International Journal of Retina and Vitreous, vol. 2, No. 27, Dec. 2016, 5 pages.

Hwang, et al., "Automated Quantification of Nonperfusion Areas in 3 Vascular Plexuses With Optical Coherence Tomography Angiography in Eyes of Patients With Diabetes," JAMA Ophthalmology, vol. 136, No. 8, Jun. 2018, pp. 929-936.

Hwang, et al., "Optical Coherence Tomography Angiography Features of Diabetic Retinopathy," Retina, vol. 35, No. 11, Nov. 2015, 14 pages.

Hwang, et al., "Visualization of 3 Distinct Retinal Plexuses by Projection-Resolved Optical Coherence Tomography Angiography in Diabetic Retinopathy," JAMA Ophthalmology, vol. 134, No. 12, Nov. 2016, pp. 1411-1419.

Jia, et al., "Quantitative optical coherence tomography angiography of vascular abnormalities in the living human eye," PNAS USA, vol. 112, No. 18, Apr. 2015, pp. E2395-E2402.

Jia, et al., "Split-spectrum amplitude-decorrelation angiography with optical coherence tomography," Optics Express, vol. 20, No. 4, Feb. 2012, pp. 4710-4725.

Joussen, et al., "A central role for inflammation in the pathogenesis of diabetic retinopathy," FASEB Journal, vol. 18, No. 12, Jul. 2004, 17 pages.

Karri, et al., "Transfer learning based classification of optical coherence tomography images with diabetic macular edema and dry age-related macular degeneration," Biomedical Optics Express, vol. 8, No. 2, Feb. 2017, pp. 579-592.

Kermany, et al., "Identifying Medical Diagnoses and Treatable Diseases by Image-Based Deep Learning," Cell, vol. 172, No. 5, Feb. 2018, pp. 1122-1131 (19 pages).

Kingma, et al., "Adam: A Method for Stochastic Optimization," arXiv, Jan. 2017, 15 pages.

Lee, et al., "Deep Learning is Effective for Classifying Normal versus Age-Related Macular Degeneration OCT Images," Ophthalmology Retina, vol. 1, No. 4, Jul.-Aug. 2017, pp. 322-327.

Lee, et al., "Deep-learning based, automated segmentation of macular edema in optical coherence tomography," Biomedical Optics Express, vol. 8, No. 7, Jul. 2017, pp. 3440-3448.

Lee, et al., "Generating retinal flow maps from structural optical coherence tomography with artificial intelligence," Scientific Reports, vol. 9, No. 5694, Apr. 2019, 11 pages.

Litjens, et al., "A survey on deep learning in medical image analysis," Medical Image Analysis, arXiv, vol. 42, Jun. 2017, 39 pages.

Liu, et al., "Extended axial imaging range, widefield swept source optical coherence tomography angiography," Journal of Biophotonics, vol. 10, No. 11, Nov. 2017, 20 pages.

Long, et al., "Fully Convolutional Networks for Semantic Segmentation," Proceedings of the IEEE Conference on Computer Vision and Pattern Recognition, vol. 39, No. 4, Jun. 2015, pp. 3431-3440.

Nesper, et al., "Quantifying Microvascular Abnormalities With Increasing Severity of Diabetic Retinopathy Using Optical Coherence Tomography Angiography," IOVS, vol. 58, Oct. 2017, pp. 307-315.

Ng, "Feature selection, L1 vs. L2 regularization, and rotational invariance," retrieved on Jul. 7, 2021 at <<http://cseweb.ucsd.edu/~elkan/254spring05/Hammon.pdf>>, Proceedings of the Twenty-First International Conference on Machine Learning, Apr. 2005, 20 pages.

Niki, et al., "Distribution of capillary nonperfusion in early-stage diabetic retinopathy," Ophthalmology, vol. 91, No. 12, Dec. 1984, pp. 1431-1439.

PCT Search Report and Written Opinion dated Jul. 22, 2020 for PCT Application No. PCT/US20/29941, 8 pages.

Ronneberger, et al., "U-Net: Convolutional Networks for Biomedical Image Segmentation," arXiv,, May 2015, pp. 234-241 (8 pages).

(56) References Cited

OTHER PUBLICATIONS

Roy, et al., "ReLayNet: retinal layer and fluid segmentation of macular optical coherence tomography using fully convolutional networks," Biomedical Optics Express, vol. 8, No. 8, Aug. 2017, pp. 3627-3642.

Schottenhamml, et al., "An automatic, intercapillary area based algorithm for quantifying diabetes related capillary dropout using OCT angiography," Retina, vol. 36, No. 1, Dec. 2016, 15 pages.

Simonyan, et al., "Very Deep Convolutional Networks for Large-Scale Image Recognition," arXiv, Apr. 2015, 14 pages.

Spaide, et al., "Optical coherence tomography angiography," Progress in Retinal and Eye Research, vol. 64, Dec. 2017, pp. 1-55.

Srinivasan, et al., "Fully automated detection of diabetic macular edema and dry age-related macular degeneration from optical coherence tomography images," Biomedical Optics Express, vol. 5, No. 10, Oct. 2014, pp. 3568-3577.

Szegedy, et al., "Inception-v4, Inception-ResNet and the Impact of Residual Connections on Learning," Proceedings of the Thirty-First AAAI Conference Artificial Intelligence, Feb. 2017, pp. 4278-4284.

Ting, et al., "Artificial intelligence and deep learning in ophthalmology," British Journal of Ophthalmol, vol. 103, Feb. 2019, pp. 167-175.

Treder, et al., "Automated detection of exudative age-related macular degeneration in spectral domain optical coherence tomography using deep learning," Graefe's Archive for Clinical and Experimental Ophthalmology, vol. 256, Feb. 2018, pp. 259-265.

Venhuizen, et al., "Deep learning approach for the detection and quantification of intraretinal cystoid fluid in multivendor optical coherence tomography," Biomedical Optics Express, vol. 9, No. 4, Mar. 2018, pp. 1545-1569.

Venhuizen, et al., "Robust total retina thickness segmentation in optical coherence tomography images using convolutional neural networks," Biomedical Optics Express, vol. 8, No. 7, Jun. 2017, pp. 3292-3316.

Wang, et al., "Automated detection of preserved photoreceptor on optical coherence tomography in choroideremia based on machine learning," Journal of BIOPhotonics, 11(5):e201700313, May 2018, 20 pages.

Wang, et al., "Automated detection of photoreceptor disruption in mild diabetic retinopathy on volumetric optical coherence tomography," Biomedical Optics Express, vol. 8, No. 12, Dec. 2017, pp. 5384-5398.

Wessel, et al., "Peripheral retinal ischaemia, as evaluated by ultra-widefield fluorescein angiography, is associated with diabetic macular oedema," British Journal of Ophthalmology, vol. 96, No. 5, Mar. 2012, pp. 694-698.

Zhang, et al., "A Novel Strategy for Quantifying Choriocapillaris Flow Voids Using Swept-Source OCT Angiography," Investigative Ophthalmology & Visual Science, vol. 59, Jan. 2018, pp. 203-211.

Zhang, et al., "Advanced image processing for optical coherence tomographic angiography of macular diseases," Biomedical Optics Express, vol. 6, No. 12, Dec. 2015, pp. 4661-4675.

Zhang, et al., "Automated Quantification of Nonperfusion in Three Retinal Plexuses Using Projection-Resolved Optical Coherence Tomography Angiography in Diabetic Retinopathy," Investigative Ophthalmology & Visual Science, vol. 57, No. 13, Oct. 2016, pp. 5101-5106.

Zhang, et al., "Projection-resolved optical coherence tomographic angiography," Biomedical Optics Express, vol. 7, No. 3, Mar. 2016, pp. 816-828.

* cited by examiner

US 11,263,747 B2

DETECTING AVASCULAR AREAS USING NEURAL NETWORKS

CROSS-REFERENCE TO RELATED APPLICATION

This application claims the priority of U.S. provisional application No. 62/839,317, entitled "Detecting Avascular Areas Using Neural Networks," and filed on Apr. 26, 2019, which is incorporated by reference herein in its entirety.

STATEMENT REGARDING FEDERALLY SPONSORED RESEARCH

This invention was made with government support under EY027833 awarded by the National Institutes of Health. The government has certain rights in the invention.

BACKGROUND

Diabetic Retinopathy (DR) is a leading cause of blindness. See Joussen et al., FASEB J. 18(12), 1450-52 (2004) & Antonetti et al, N. ENGL. J. MED. 366(13), 1227-39 (2012). Capillary damage from hyperglycemia causes vision loss through downstream effects, such as retinal ischemia, diabetic macular edema, and neovascularization.

Clinicians can diagnose various complications of DR by identifying abnormal avascular areas in the eyes of diabetic patients. Clinicians have used structural Optical Coherence Tomography (OCT) to objectively guide the treatment of diabetic macular edema. However, clinicians generally rely on Fluorescein Angiography (FA) to assess disease severity and treatment threshold for DR complications. See, e.g., Wessel et al., BR. J. OPHTHALMOL. 96(5), 694-98 (2012).

FA, however, has a number of problems that limit its applicability. FA requires administering fluorescent dyes to patients, which can result in a number of complications for patients, such as nausea. Due in part to the administration of dyes, FA requires a great deal of time to perform. In addition, FA requires highly specialized equipment that can be inaccessible to lower-resource environments. Further, FA-based diagnosis is highly subjective to individual clinicians and requires specialized training to perform accurately. All of these problems can make FA relatively inaccessible to patients in low-resource environments, such as community health clinics.

OCT Angiography (OCTA) is a recently developed imaging technique that can provide label-free, three-dimensional images of retinal and choroidal circulation with capillary detail. Jia et al., PROC. NATL. ACAD. SCI. U.S.A. 112(18), E2395-02 (2015) & Hussain et al., INT. J. RETINA VITREOUS 2(OCT), 27-36 (2016). OCTA is safer, faster, and less expensive than conventional dye-based angiography.

SUMMARY

An example system includes an output device; at least one processor; and memory storing: a convolutional neural network (CNN) including a multi-scale block, a merge block, at least one encoder block, and at least one decoder block; and instructions. When executed by the at least one processor, the instructions cause the system to perform operations including generating, using at least one first convolution layer in the multi-scale block, a first output image by cross-correlating at least one first filter with at least one input image using a first dilation rate, the at least one input image including an optical coherence tomography (OCT) reflectance image depicting a superficial vascular complex (SVC) of a retina and an optical coherence tomography angiography (OCTA) image depicting the SVC. The instructions further cause the system to generate, using at least one second convolution layer in the multi-scale block, a second output image by cross-correlating at least one second filter with the at least one input image using a second dilation rate, the first dilation rate being different than the second dilation rate; generating, using the merge block, a merged image by concatenating the first output image and the second output image; generating, using the at least one encoder block, at least one third output image by cross-correlating at least one third filter with the merged image; and generating, using the at least one decoder block, an avascular map by cross-correlating at least one fourth filter with the at least one third output image, the avascular map indicating at least one avascular area of the SVC. Further, the instructions cause the system to display the OCTA image overlaid with the avascular map.

In some implementations, the system further includes an imaging device configured to obtain a plurality of B-scans of the retina. In some examples, the operations further include identifying a slab in the plurality of B-scans corresponding to the SVC by identifying a first boundary between a vitreous and an internal limiting membrane (ILM) of the retina depicted in the plurality of B-scans and a second boundary between a superficial vascular complex (SVC) and a deep vascular complex (DVC) of the retina based on the plurality of B-scans, the slab being defined between the first boundary and the second boundary; generating the OCT reflectance image by calculating a mean projection of the slab; and generating the OCTA image by calculating a maximum projection of the slab.

In some examples, generating the avascular map includes: generating a second merged image by concatenating, using a first decoder block among the one or more decoder blocks, a fourth output image and a fifth output image among the one or more third output images, the fourth output image being output by a first encoder block among the one or more encoder blocks, the fourth output image being output by a second encoder block among the one or more encoder blocks; generating, using the first decoder block, a sixth output image by cross-correlating the second merged image with a fifth filter among the one or more fourth filters; and generating the avascular map based on the sixth output image.

An example method includes generating, using a multi-scale block of a convolutional neural network (CNN), a first output image based on an optical coherence tomography (OCT) reflectance image of a retina and an OCT angiography (OCTA) image of the retina; generating, using an encoder of the CNN, at least one second output image based on the first output image; generating, using a decoder of the CNN, a third output image based on the at least one second output image; and generating an avascular map based on the third output image, the avascular map indicating at least one avascular area of the retina depicted in the OCTA image.

In some cases, generating the first output image includes: generating fourth output images by convolving or cross-correlating the OCT reflectance image and the OCTA image with filters using different dilation rates; and generating the first output image by concatenating the fourth output images.

In some examples, the at least one second output image including multiple output images, and generating the third output image includes: generating a merged image by merging two of the second output images; and generating the third output image by convolving or cross-correlating the merged image with at least one filter.

In some instances, generating the avascular map includes convolving or cross-correlating the third output image with at least one filter.

According to some examples, the OCT reflectance image and the OCTA image depict an area of the retina that is at least 6×6 mm².

In some cases, the example method further includes identifying a plurality of B-scans of the retina; identifying a first boundary between a vitreous and an internal limiting membrane (ILM) of the retina depicted in the plurality of B-scans; identifying a second boundary between an internal limiting membrane (ILM) and a superficial vascular complex (SVC) of the retina depicted in the plurality of B-scans; identifying a slab in the B-scans between the first boundary and the second boundary; generating the OCT reflectance image based on the slab; and generating the OCTA image based on the slab. In some cases, generating the OCT reflectance image includes calculating a mean projection of the slab. In some examples, generating the OCTA image includes calculating a mean projection and/or a maximum projection of the slab.

The example method may further include displaying, on an output device, the OCTA image overlaid with the avascular map, the at least one avascular area of the SVC being indicated by a first color that is different than a second color in the OCTA image.

An example system may include at least one processor; and memory storing: a convolutional neural network (CNN) including filters; and instructions that, when executed by the at least one processor, cause the system to perform operations. The operations, for example, include identifying optical coherence tomography (OCT) reflectance images depicting retinas; identifying OCTA images depicting the retinas; generating, using the CNN, estimated avascular maps indicating avascular areas of the retinas based on the OCT reflectance images and the OCTA images; and optimizing parameters of the filters by minimizing a loss between the estimated avascular maps and ground truth avascular maps indicating avascular areas of the retinas.

In some cases, the retinas include at least one healthy retina, at least one retina exhibiting diabetic retinopathy (DR), and at least one retina developing DR.

According to some examples, optimizing the parameters of the filters includes using a Stochastic Gradient Descent (SGD) optimizer with an exponential decay learning rate to minimize the loss.

In some cases, the operations further include: generating a ground truth map among the ground truth maps by: receiving a first indication that a first pixel of an OCTA image among the OCTA images indicates a vascular area, the first indication corresponding to a first assessment by a first expert; receiving a second indication that the first pixel indicates an avascular area, the second indication corresponding to a second assessment by a second expert; receiving a third indication that the first pixel indicates the avascular area, the third indication corresponding to a third assessment by a third expert; determining that the pixel indicates the avascular area based on the first indication, the second indication, and the third indication; and defining a second pixel of the ground truth map as indicating an avascular area, the second pixel of the ground truth map corresponding to the first pixel of the OCTA image.

According to some examples, generating the estimated avascular maps includes: cross-correlating or convolving the filters with the OCT reflectance images and the OCTA images.

In some cases, the OCT reflectance images and the OCTA images depict areas of the retinas that are at least 6×6 mm².

In various examples, the filters include at least one 3×3 pixel filter and/or at least one 1×1 pixel filter.

In some examples, the CNN includes: a multi-scale block including a first set of the filters, the third set of the filters including atrous filters configured to apply multiple dilation rates; and an encoder including a second set of the filters; and a decoder including a third set of the filters.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The patent or application file contains at least one drawing executed in color. Copies of this patent or patent application publication with color drawing(s) will be provided by the Office upon request and payment of the necessary fee.

FIG. 15 illustrates en face SVC angiograms of healthy and Non-Proliferative Diabetic Retinopathy (NPDR) subjects.

Figure 16A:
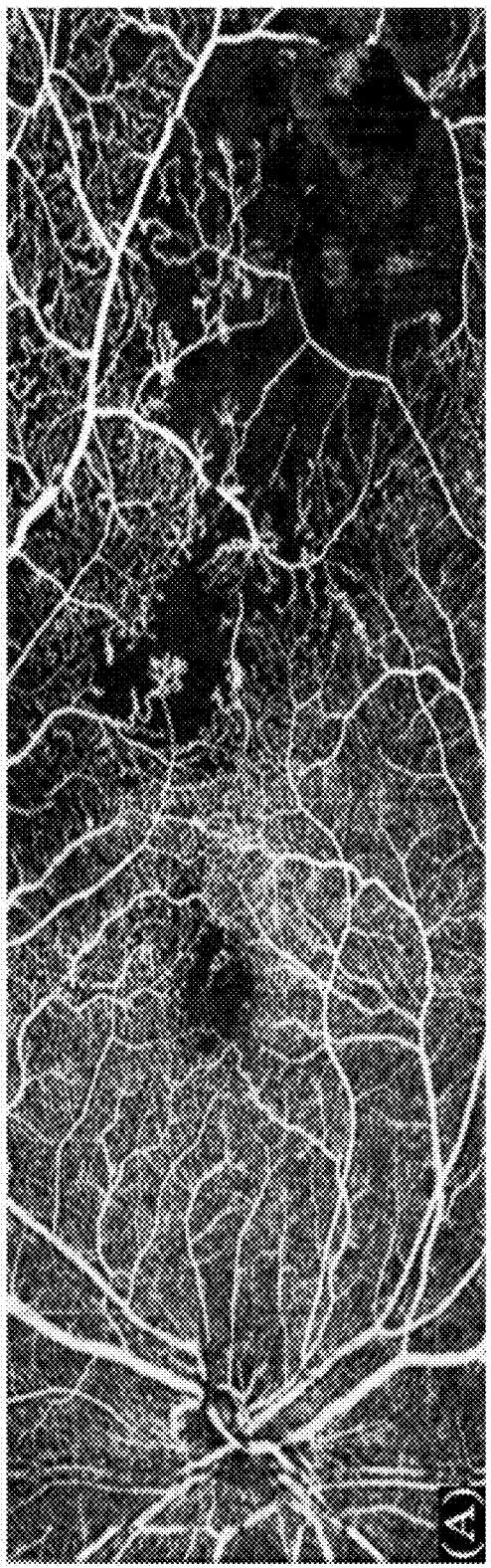
FIG. 16A illustrates an ultra-wide field OCTA of an eye with diabetic retinopathy obtained by montaging three 8×10 mm² wide field OCTA en face angiograms of SVC. FIG.

16B illustrates a vascular area detected on the eye represented in FIG. 16A overlaid on the en face angiogram of the SVC.

DETAILED DESCRIPTION

This disclosure describes systems, devices, and techniques for training neural networks to identify avascular areas of OCT-based images, such as OCTA images. This disclosure also describes systems, devices, and techniques for utilizing trained neural networks to identify avascular areas of OCT-based images.

Screening and assessing DR are essential for reducing morbidity associated with diabetes. Macular ischemia is known to correlate with the severity of retinopathy. Recent studies have shown that OCTA, with intrinsic contrast from blood flow motion, is well suited for quantified analysis of the avascular area, which is potentially a useful biomarker in DR.

Prior studies have demonstrated that the avascular area of the superficial capillary complex in the retina is an important indicator of DR stage and progression. See, e.g., Zhang et al., INVEST. OPHTHALMOL. VIS. SCI. 57(13), 5101-06 (2016); Hwang et al., RETINA 35(11), 2371-76 (2015); Hwang et al., JAMA OPHTHALMOL. 134(12), 1411-19 (2016); & Hwang et al., JAMA OPHTHALMOL. 136(8), 929-36 (2018). In order to accurately measure the avascular area, in certain implementations disclosed herein, OCTA flow pixels were classified properly in order to correctly identify regions with abnormal inter-vascular space. However, discriminating vascular signal in OCTA is a challenging task owing to the dependence of background flow signal on local tissue reflectivity and the confounding effects of eye motion. Camino et al., BIOMED. OPT. EXPRESS 8(6), 3053-66 (2017) & Camino et al., BIOMED. OPT. EXPRESS 7(10), 3905-15 (2016).

High-speed OCT systems (see, e.g., Liu et al., J. BIOPHOTONICS 10(11), 1464-72 (2017)) and efficient OCTA algorithms (see, e.g., Jia et al, OPT. EXPRESS 20(4), 4710-25 (2012)) have made possible the acquisition of considerably larger fields of view (6×6 mm$^2$ or more). Unfortunately, larger fields of view introduce new image processing challenges to the classification of flow pixels. For instance, 6×6 mm$^2$ OCT angiograms are more likely to contain shadows caused by vitreous floaters or pupil vignetting, and are more vulnerable to shadowing effects due to lower sampling rates. Moreover, the 6×6 mm$^2$ area encompasses vasculature on two sides of the fovea (optic disc vs temporal side) in which the normal inter-vascular space is significantly different. In order to account for these and other issues, more sophisticated detection/segmentation algorithms are described herein.

In some implementations, segmentation can be considered a pixel-wise classification problem and can be amenable to machine learning approaches. Fully Convolutional Networks (FCNs) have been proposed to transform fully connected layers in Convolutional Neural Networks (CNNs) into convolutional layers, in order to convert the network output into a heat map. See, e.g., Long et al., IEEE TRANSACTIONS ON PATTERN ANALYSIS AND MACHINE INTELLIGENCE 39(4), 3431-40 (2015). Because the encoding module can reduce the resolution of the input by a factor+(e.g., of 32_, it can be difficult for the decoding module to produce a fine segmentation map.

To solve the loss of resolution, across-layer connections have been used in fully convolutional solutions. A successful FCN called U-net added a contracting path to capture context and a symmetric expanding path to identify the location of objects with precision. See, e.g., Ronneberger et al. in MEDICAL IMAGE COMPUTING AND COMPUTER-ASSISTED INTERVENTION—MICCAI 2015, N. Navab et al., eds. (2015), pp. 234-41. Another network, known as Deeplab, can use atrous convolution kernels, which can reduce the loss of resolution but also reduce the number of trainable parameters, thereby improving segmentation accuracy. See, e.g., Chen et al., IEEE TRANS. PATTERN ANAL. MACH. INTELL. 40(4), 834-48 (2018) & Chen et al., CoRR abs/1706.05587 (2017). Other state-of-the-art network structures (see, e.g., Simonyan et al., arXiv preprint arXiv:1409.1556 (2014) (describing a neural network known as VGG); He et al. in PROCEEDINGS OF THE IEEE CONFERENCE ON COMPUTER VISION AND PATTERN RECOGNITION (2016), pp. 770-78 (describing a neural network known as ResNet); & Szegedy et al. Inception-v4, inception-resnet and the impact of residual connections on learning, in AAAI (2017), p. 12 (describing a neural network known as Inception)) as a part of semantic segmentation network can streamline the design process of network and can take the advantage of the superior performance of existing networks. For example, a neural network known as Segnet, which borrows a network structure similar to VGG, can provide an efficient semantic segmentation network. See, e.g., Badrinarayanan et al., arXiv preprint arXiv:1511.00561 (2015).

Several other machine learning solutions have segmented pathological areas with abnormal tissue reflectance characteristics in OCT images. See, e.g., Fang et al, BIOMED. OPT. EXPRESS 8(5), 2732-44 (2017); Srinivasan et al., BIOMED. OPT. EXPRESS 5(10), 3568-77 (2014); Karri et al., BIOMED. OPT. EXPRESS 8(2), 579-92 (2017); Camino et al BIOMED. OPT. EXPRESS 9(7), 3092-05 (2018); Wang et al., J. BIOPHOTONICS 11(5), e201700313 (2018); Wang et al., BIOMED. OPT. EXPRESS 8(12), 5384-98 (2017). The metrics based on OCTA image analysis can complement OCT for earlier assessment of ocular diseases with a vascular component, such as DR. Some researchers have built deep convolution networks capable of segmenting the foveal microvasculature on OCTA images. Prentašic et al., J. BIOMED. OPT. 21(7), 75008 (2016). However, none of these studies have proposed a network that can effectively and accurately segment vascular areas from non-vascular areas in OCT images.

In this disclosure, various deep learning solutions for segmenting avascular areas in OCTA of DR are disclosed. Particular implementations utilize a novel network design that includes a Multi-scaled Encoder-Decoder neural network (MEDnet) to detect non-perfusion areas in 6×6 mm$^2$ and in ultra-wide field retinal angiograms. Avascular areas can be effectively detected in DR subjects of various disease stages as well as in the foveal avascular zone of healthy subjects.

Particular neural networks described herein provide accurate diagnoses of avascularity using relatively inexpensive and non-toxic imaging modalities, such as structural OCT and OCTA. In some examples demonstrated herein, neural networks can predict avascular areas based on OCTA images and OCT reflectance images with an accuracy of 81.88%. This level of accuracy is comparable to previous work, in which avascular areas were predicted from high-quality 3×3 mm OCTA high-definition scans. See, e.g., Zhang et al., INVEST OPHTHALMOL VIS SCI, 57(13), 5101-06 (2016). However, unlike the previous work, implementations of the present disclosure were able to achieve this high accuracy without excluding low-quality scans for training. See id.

According to various implementations, a neural network can be trained using OCT images with known avascular regions. The avascular regions of the training images may be manually segmented (i.e., defined) by one or more experts.

In some cases, the neural network can be trained using both OCT reflectance images and OCTA images of the same retinas. An OCT reflectance image and OCTA image of a retina can be generated from multiple B-scans of the retina. When the neural network is trained using OCT images depicting a wide variety of disease progressions, the accuracy of the trained neural network can be enhanced.

Once trained, the neural network can be used to accurately predict avascular regions of new OCT images. When a particular OCT image is input into the trained neural network, the trained neural network can output a map of a predicted avascular region corresponding to the particular OCT image. According to some implementations, the neural network may output a probability map including multiple elements that respectively correspond to the likelihood that a given pixel in the particular OCT image depicts an area of vascularity or avascularity. By applying a probability threshold to the probability map, a map of the predicted avascular region can be generated. In some cases, a clinical device can display the map indicating the predicted avascular region overlaid with the particular OCT image. Accordingly, clinicians can easily identify areas of clinical interest in particular OCT image.

In particular implementations, a neural network for identifying avascular areas of OCT images can include multiple convolution blocks arranged in series and/or parallel. Each of the convolution blocks may correspond to at least one parameter that can be defined by training the neural network.

In some instances, the neural network can include a multi-scale block that includes multiple convolution blocks arranged in parallel. The convolution blocks in the multi-scale block may apply convolution kernels with different dilation rates. The neural network may further include at least one merge block that can merge the outputs of the parallel convolution blocks in the multi-scale block. A merge block may concatenate the outputs of the parallel convolution blocks along a depth axis. Accordingly, the multi-scale block can enable the neural network to accurately process OCT images taken at various angles and scales. Example neural networks described herein may also include one or more batch normalization blocks. The batch normalization blocks can reduce overfitting during training.

Various implementations described herein provide improvements to the technical field of medical imaging. In particular examples, a neural network can automatically generate avascular maps based on OCT images. These avascular maps can provide clinicians, who may lack specialized training, with the opportunity to accurately diagnose complications of DR. In some cases, the avascular maps can be displayed overlying OCT images, which can assist clinicians with diagnosing nonperfusion and other complications of DR.

In certain instances, accurate avascular maps can be generated without administering FA to subjects. Accordingly, the administration of dyes and/or contrast agents can be avoided, thereby saving time and cost. Furthermore, patient discomfort or other adverse reactions, due to the administration of the dyes and/or contrast agents, can be avoided.

In addition, various implementations described herein provide novel neural networks that are particularly effective at generating avascular maps from OCT images. These neural networks include a novel arrangement of functions that can accurately perform vascular segmentation on OCT images, such as OCTA images.

As used herein, the term "OCT image," and its equivalents, can refer to an OCT reflectance image, an OCTA image, or a combination thereof.

As used herein, the term "segmentation," and its equivalents, can refer to a process of defining an image into different areas or regions. For instance, a segmentation method may determine vascular or avascular regions in OCT images.

As used herein, the terms "vascular," "perfusion," and the like can refer to an area of an image that depicts vasculature. In some cases, a perfusion area can refer to an area that depicts a blood vessel or another type of vasculature.

As used herein, the terms "avascular," "nonperfusion," and the like can refer to an area of an image that does not depict vasculature. In some cases, a nonperfusion area can refer to an area between blood vessels or other types of vasculature.

As used herein, the terms "blocks," "layers," and the like can refer to devices, systems, and/or software instances (e.g., Virtual Machine (VM) instances) that generates an output by apply an operation to an input. A "convolutional block," for example, can refer to a block that applies a convolution operation to an input (e.g., an image). When a first block is in series with a second block, the first block may accept an input, generate an output by applying an operation to the input, and provide the output to the second block, wherein the second block accepts the output of the first block as its own input. When a first block is in parallel with a second block, the first block and the second block may each accept the same input, and may generate respective outputs that can be provided to a third block. In some examples, a block may be composed of multiple blocks that are connected to each other in series and/or in parallel. In various implementations, one block may include multiple layers.

In some cases, a block can be composed of multiple neurons. As used herein, the term "neuron," or the like, can refer to a device, system, and/or software instance (e.g., VM instance) in a block that applies a kernel to a portion of an input to the block.

As used herein, the term "kernel," and its equivalents, can refer to a function, such as applying a filter, performed by a neuron on a portion of an input to a block. A neuron may have a "receptive field," which can define an outer edge of the portion of the input to which a neuron applies a kernel. Some examples of a receptive field can include a 2×2 pixel area, a 3×3 pixel area, a 4×4 pixel area, or the like.

As used herein, the term "pixel," and its equivalents, can refer to a value that corresponds to an area or volume of an image. In a grayscale image, the value can correspond to a grayscale value of an area of the grayscale image. In a color image, the value can correspond to a color value of an area of the color image. In a binary image, the value can correspond to one of two levels (e.g., a 1 or a 0). The area or volume of the pixel may be significantly smaller than the area or volume of the image containing the pixel.

As used herein, the term "image," and its equivalents, can refer to a two-dimensional image or a three-dimensional image. In some cases, an image can correspond to a two-dimensional matrix including multiple elements arranged in rows and columns, wherein each of the elements corresponds to a pixel.

As used herein, the terms "dilation rate," "dilation level," and the like can refer to a scaling factor between the receptive field of a neuron and an output of the neuron. For instance, if a neuron has a receptive field corresponding to a 3×3 pixel area and outputs a 3×3 pixel area, the dilation rate of the neuron is 1. If, however, a receptive field of a neuron corresponds to a larger area than the output of the neuron, the neuron may have a dilation rate of greater than 1.

Various implementations of the present disclosure will now be described with reference to FIGS. 1-11.

Figure 1:
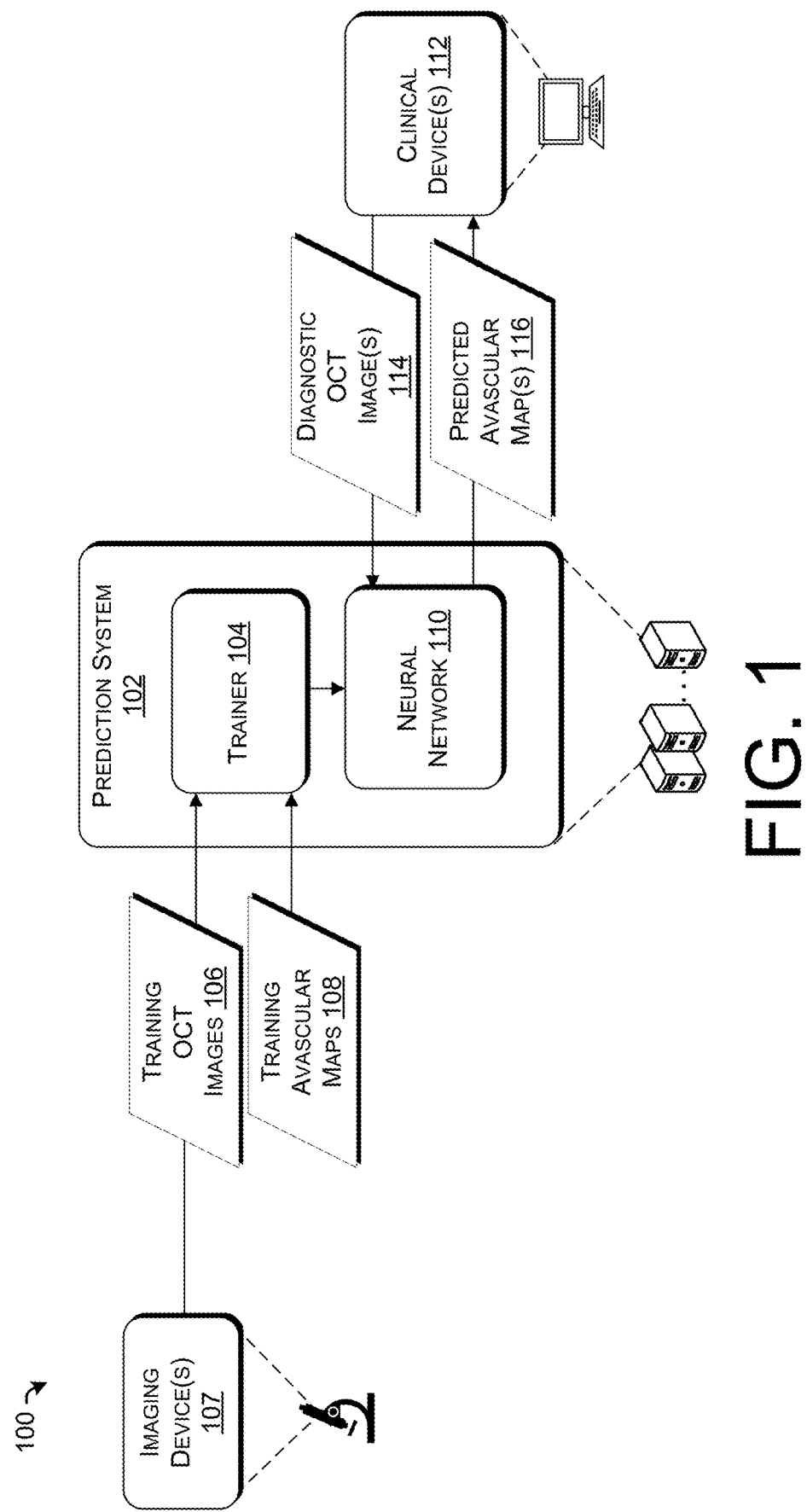
FIG. 1 illustrates an example environment for training and utilizing a neural network.

FIG. 1 illustrates an example environment 100 for training and utilizing a neural network. A prediction system 104 may include a trainer 104. The trainer 104 can receive multiple training OCT images 106. In some cases, the training OCT images 106 can include OCT angiograms and/or OCT reflectance images.

In some examples, the training OCT image(s) 106 can be captured by one or more imaging devices 107. The imaging device(s) 107 can include at least one OCT imaging device, OCT reflectance imaging device, at least one OCT angiography device, a combination thereof, or the like. According to particular examples, the training OCT image(s) 106 can include images captured by multiple, different devices. The training OCT images 106 may include OCTA images (also referred to as "OCT angiograms") and/or OCT reflectance images.

According to various implementations described herein, an OCTA image and an OCT reflectance image of the same retina can be obtained based on a volumetric scan of the retina. In some examples, various (e.g., hundreds of) B-scans of the retina can be obtained via an OCT imaging system within the imaging device(s) 107. Each B-scan may correspond to a two-dimensional image that includes multiple (e.g., hundreds of) A-lines. The B-scans may be obtained over a relatively large field of view, such as an area of at least 6×6 mm$^2$. The area may be perpendicular and/or cross a direction that crosses the layers of the retina. The B-scans of the retina may be referred to as "volumetric data" of the retina. The OCTA image can be generated from the volumetric data using, for instance, the Splitspectrum Amplitude Decorrelation Angiography (SSADA) algorithm or some other suitable OCTA image generation technique. See Jia et al., OPT. EXPRESS 20(4), 4710-25 (2012).

In some cases, the OCTA image and the OCT reflectance image may depict one or more layers of the retina. In various examples described herein, an OCTA image and an OCT reflectance image may depict a Superficial Vascular Complex (SVC) of a retina. For example, layers within the retina depicted in the volumetric data can be segmented, e.g., using a graph search method. See Zhang et al., BIOMED. OPT. EXPRESS 6(12), 4661-75 (2015). The OCTA image and the OCT reflectance image may be generated from a slab of the volumetric data extending between two of the segmented boundaries of the layers of the retina. In some implementations, the OCT reflectance image can be generated by obtaining an average image of the slab in a depth direction (e.g., a direction crossing the retinal boundaries). According to some implementations, the OCTA image can be generated by obtaining a mean projection and/or a maximum projection of the slab in the depth direction.

The trainer 104 may further receive multiple training avascular maps 108. In various implementations, the training avascular maps 108 correspond to the training OCT images 106. In some examples, each avascular map among the training avascular maps 108 may correspond to one OCTA image and one OCT reflectance image in the training OCT images 106. An image may "correspond" to another image if it depicts and/or is derived from the same subject (e.g., the same retina).

In particular implementations, the avascular maps 108 may be generated by one or more experts. For instance, an expert may select individual pixels in an OCT image that correspond to avascular areas in the OCT image, and an avascular map corresponding to the selected pixels in the OCT image may be generated. In some cases, the avascular map may have the same dimensions (i.e., the same number of pixels) as the OCT image. The avascular map may be a binary image, wherein each of the selected pixels corresponds to one level (e.g., 1) and each of the unselected pixels corresponds to another level (e.g., 0).

In some cases, multiple experts may have different opinions on whether a given pixel in an OCT image depicts an avascular region. According to particular implementations, a majority vote of the experts may be used to determine whether the pixel is defined as an avascular region or a vascular region for the purposes of the final avascular map. For example, if there are three experts, two experts believe a pixel in an OCT image depicts a vascular region, one expert believes the pixel depicts an avascular region, a corresponding pixel in an avascular map may be defined as a vascular region.

The trainer 104 may use the training OCT images 106 and the training avascular maps 108 to train a neural network 110. The neural network 110 may be trained to accept an OCT image as an input and output an avascular map corresponding to the OCT image. In various implementations, the neural network 110 may include multiple layers that can perform various operations on input OCT images. In particular implementations, at least one of the layers may perform convolution operations, cross-correlation operations, batch normalization operations, pooling operations, or the like, on various sections of the input images. The layers may be connected to each other in series, in parallel, or both.

In particular examples, the neural network 110 may include multiple convolutional layers. A convolutional layer may include multiple neurons. Each neuron may individually perform an operation on a segment of an input image to the layer. The area of the segment may relate to a receptive field and a dilation rate of the neuron. In some implementations, the neuron may convolve (or cross-correlate) the segment with a filter. In some examples, at least one filter can be a Gaussian filter. Each filter can include at least one parameter that can affect the output of the corresponding neuron. In particular examples, each filter can be represented by a matrix that can include multiple values arranged in at least one row and at least one column.

According to various implementations, the trainer 104 may train the neural network 110 by optimizing parameters of neurons in the layers using the training OCT images 106 and the training avascular maps 108. In some cases, each filter can include multiple values respectively corresponding to multiple parameters that can be optimized individually. In certain examples, each filter corresponds to a single scaling factor that can apply to all values in the filter. The trainer 104 may include an optimizer, which may optimize the parameters of the neurons of the neural network 110. In various examples, the optimizer includes an Adam optimizer (see, e.g., Kingma et al., arXiv:1412.6980 (2017)), an RMSprop optimizer, an AdaGrad optimizer, a Stochastic Gradient Descent (SGD) optimizer, or the like.

In some examples, the trainer 104 may vary the parameters of the neurons of the neural network 110, input at least one of the training OCT images 106 into the neural network 110, and then compare the outputs of the neural network 110 to at least one of the corresponding training avascular maps 108. The trainer 104 may determine optimized parameters of the neural network 110 by optimizing a loss function. In some cases, the loss may be the sum of the mean square error and L2 regularization loss. For example, the trainer 104 may apply the following Equations (1)-(3), in order to determine the parameters:

$$E = \frac{1}{N}\sum_{i=1}^{N}(y_i - \hat{y}_i)^2 \quad (1)$$

$$R = \sum_{i=1}^{p} w_i^2 \quad (2)$$

$$T = E + R \quad (3)$$

wherein E is the mean square error, N is the number of samples in a training batch, y is the label, $\hat{y}$ is the predicted value, w is weight factor of the model, p is the total number of weight factor of the model, R is L2 regularization loss and T is the total loss.

Upon applying all of the training images 106 and all of the training avascular maps 108 to the neural network 110, the trainer 104 may determine a final set of optimized parameters for the neural network 110. Using the optimized parameters, the neural network 110 may be configured to accurately predict the avascular maps of new OCT images input into the neural network 110.

As illustrated in FIG. 1, at least one clinical device 112 may transmit at least one diagnostic OCT image 114 to the prediction system 102. In some examples, the diagnostic OCT image(s) 114 can be captured by at least one OCT imaging device, OCT reflectance imaging device, at least one OCT angiography device, a combination thereof, or the like. The device(s) used to capture the diagnostic OCT image(s) 114 may be part of, or in communication with, the clinical device(s) 112. In certain implementations in which the training OCT images 106 were captured by different devices, the device(s) used to capture the diagnostic OCT image(s) 114 may include multiple, different devices. In some cases, the same device(s) used to capture the training OCT images 106 are used to capture the diagnostic OCT image(s) 114. In various implementations, the diagnostic OCT image(s) 114 include a pair of images including an OCTA image and an OCT reflectance image of the same retina, which may be obtained from volumetric data (e.g., multiple OCT B-scan images) of the retina. In some cases, the image pair may depict an SVC of the retina. Techniques for generating the OCT reflectance image and OCTA image of the SVC are described above in the description of respect to the training OCT images 106.

The diagnostic OCT image(s) 114 may be input into the neural network 110, which may utilize the optimized parameters. In response, the neural network 110 may output at least one predicted avascular map 116 corresponding to the diagnostic OCT image(s) 114.

The prediction system 102 may transmit the predicted avascular map(s) 116 to the clinical device(s) 112. In some examples, the prediction system 102 may cause the clinical device(s) 112 to display the predicted avascular map(s) 116. For instance, the prediction system 102 may cause the clinical device(s) 112 to display the diagnostic OCT image(s) 114 overlaid with the predicted avascular map(s) 116. By displaying the predicted avascular map(s) 116, the clinical device(s) 112 may enable at least one clinician (e.g., a physician) to easily and accurately assess whether the diagnostic OCT image(s) 114 depict at least one eye with abnormal avascular regions that indicate complications of DR.

In some implementations, the prediction system 102 may be hosted on one or more devices (e.g., servers) that are located remotely from the clinical device(s) 112. For example, the prediction system 102 may receive and evaluate diagnostic OCT images 114 from multiple clinical devices 112 located in various locations (e.g., various healthcare facilities).

According to certain implementations, the prediction system 102 and/or the clinical device(s) 112 may interface with an Electronic Medical Record (EMR) system (not illustrated). The diagnostic OCT image(s) 114, predicted avascular map(s) 116, information about the diagnostic OCT image(s) 114, information about the predicted avascular map(s) 116, and the like, may be stored and/or accessed in memory stored at the EMR system.

In various implementations, at least one of the prediction system 102, the trainer 104, the neural network 110, or the clinical device(s) 112 may include at least one system (e.g., a distributed server system), at least one device, at least one software instance (e.g., a VM) hosted on system(s) and/or device(s), or the like. For instance, instructions to execute at least one of the prediction system 102, the trainer 104, the neural network 110, or the clinical device(s) 112 may be stored in memory. The instructions may be executed, in some cases, by at least one processor.

According to various examples, at least one of the training OCT image(s) 106, the training avascular maps 108, the diagnostic OCT image(s) 114, or the predicted avascular map(s) 116 may include data packaged into at least one data packet. In some examples, the data packet(s) can be transmitted over wired and/or wireless interfaces. According to some examples, the data packet(s) can be encoded with one or more keys stored by at least one of the prediction system 102, the trainer 104, the neural network 110, or the clinical device(s) 112, which can protect the data paged into the data packet(s) from being intercepted and interpreted by unauthorized parties. For instance, the data packet(s) can be encoded to comply with Health Insurance Portability and Accountability Act (HIPAA) privacy requirements. In some cases, the data packet(s) can be encoded with error-correcting codes to prevent data loss during transmission.

Figure 2:
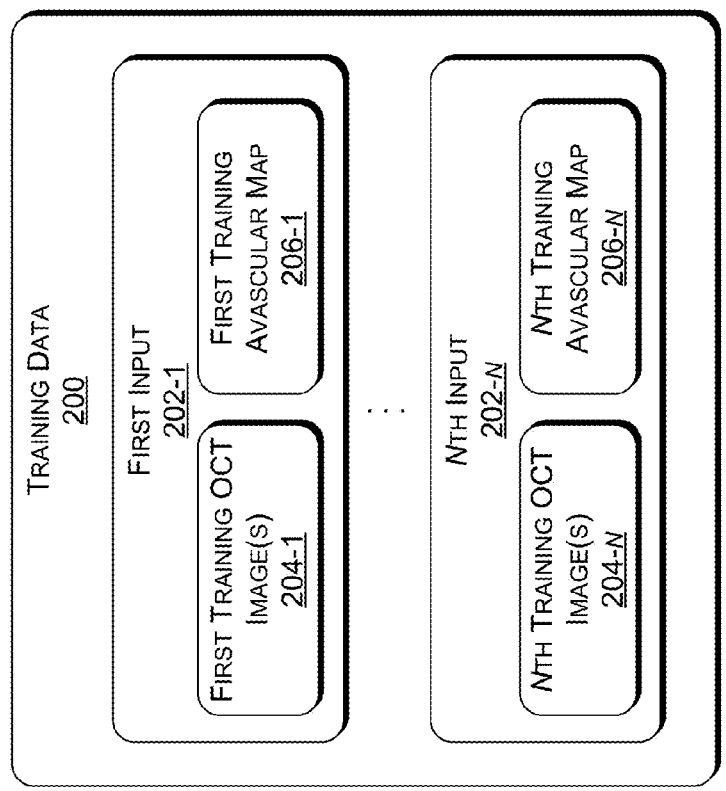
FIG. 2 illustrates an example of data used to train a neural network.

FIG. 2 illustrates an example of training data 200 used to train a neural network. In some implementations, the training data 200 may include the training OCT images 106 and the training avascular maps 108 described above with reference to FIG. 1.

The training data 200 may include first to nth training OCT image(s) 204-1 to 204-n and first to nth training avascular maps 206-1 to 206-n, which can be arranged into first to nth inputs 202-1 to 202-n, wherein n is a positive integer. In some examples, at least one of the inputs 202-1 to 202-n may include multiple training OCT images, such as an OCT reflectance image and an OCTA image. For example, the first training OCT image(s) 204-1 may include an OCT reflectance image and an OCTA image of the same eye.

According to various implementations, the first to nth training OCT images 204-1 to 204-n may include images taken of multiple eyes, images depicting multiple levels of disease progression, and/or images taken from multiple different devices. The multiple eyes may correspond to multiple different levels of disease progression of nonproliferation and/or DR. For example, the multiple eyes may include healthy eyes, eyes with non-proliferative diabetic retinopathy (NPDR), eyes with mild DR, eyes with severe DR, and the like.

In various examples, the first to nth training avascular maps 206-1 to 206-n can respectively correspond to the first to nth training OCT images 204-1 to 204-n. In some examples, the first training avascular map 206-1 may be derived from the first training OCT image(s) 204-1. For instance, one or more experts may have manually selected pixels of the first training OCT image(s) 204-1 that correspond to avascular regions, and the selected pixels may be represented in the first training avascular map 206-1. If multiple experts provide multiple sample avascular maps of the first training OCT image(s) 204-1, the first training avascular map 206-1 may be derived according to a pixel-wise majority vote of the experts. In some cases, the first to nth training avascular maps 206-1 to 206-n are binary images representing avascular and vascular areas of the training OCT images 204-1 to 204-n.

According to some examples, the number and/or dimension of pixels in a given training avascular map among the first to nth training avascular maps 206-1 to 206-n may match the number and/or dimension of pixels in a corresponding training OCT image among the first to nth training OCT images 204-1 to 204-n. For example, the first training avascular map 206-1 may have the same number of rows and columns of pixels as the first training OCT image(s) 204-1 to 204-n.

Figure 3:
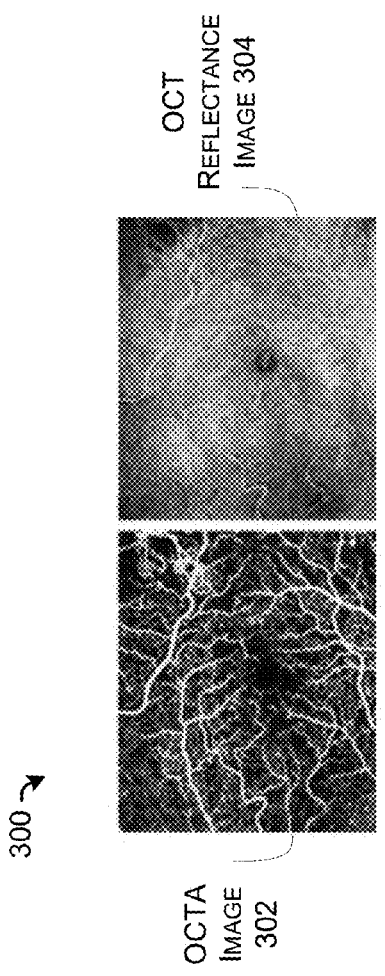
FIG. 3 illustrates an example of OCT images used to train a neural network.

FIG. 3 illustrates an example of OCT images 300 used to train a neural network. For example, the OCT images 300 can represent the diagnostic OCT image(s) 114 described above with reference to FIG. 1. In some cases, the OCT images 300 may correspond to the first training OCT image(s) 204-1 or the nth training OCT image(s) 204-n described above with reference to FIG. 2.

As illustrated, the OCT images 300 can include an OCTA image 302 and an OCT reflectance image 304. The OCTA image 302 and the OCT reflectance image 304 may correspond to the same scan. The OCT image 302 and the OCT reflectance image 304 may have at least one of the same field of view and the same resolution, in some cases.

In various implementations, the inclusion of the OCT reflectance image 304 can be used to reduce the impact of artifacts and other noise in the OCTA image 302. For instance, when a neural network is trained with both the OCTA image 302 and the OCT reflectance image 304, the OCT reflectance image 304 can reduce the influence of artifacts in the OCTA image 302 on the parameters of the neural network.

Figure 4:
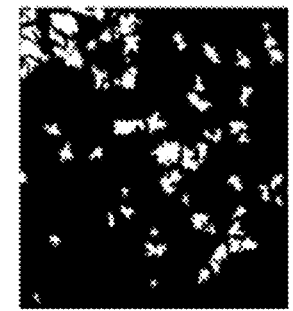
FIG. 4 illustrates an example of an avascular map corresponding to the OCT images illustrated in FIG. 3.

FIG. 4 illustrates an example of an avascular map 400 corresponding to the OCT images 300 illustrated in FIG. 3. For example, the avascular map 400 may correspond to the predicted avascular map(s) 116 described above with reference to FIG. 1. In some examples, the avascular map 400 may correspond to the first training avascular map 206-1 or the nth training avascular map 206-n described above with reference to FIG. 2.

The avascular map 400 can be a binary image with two levels, represented in FIG. 4 as black and white. The first level (e.g., the black shapes illustrated in FIG. 4) may correspond to vascular regions of the OCTA image 302 and/or the OCT reflectance image 304 of FIG. 3. The second level (e.g., the white shapes illustrated in FIG. 4) may correspond to avascular regions of the OCTA image 302 and/or the OCT reflectance image 304 of FIG. 3. The avascular map 400 may have the same pixel dimensions as the OCTA image 302 and/or the OCT reflectance image 304 of FIG. 3.

Figure 5:
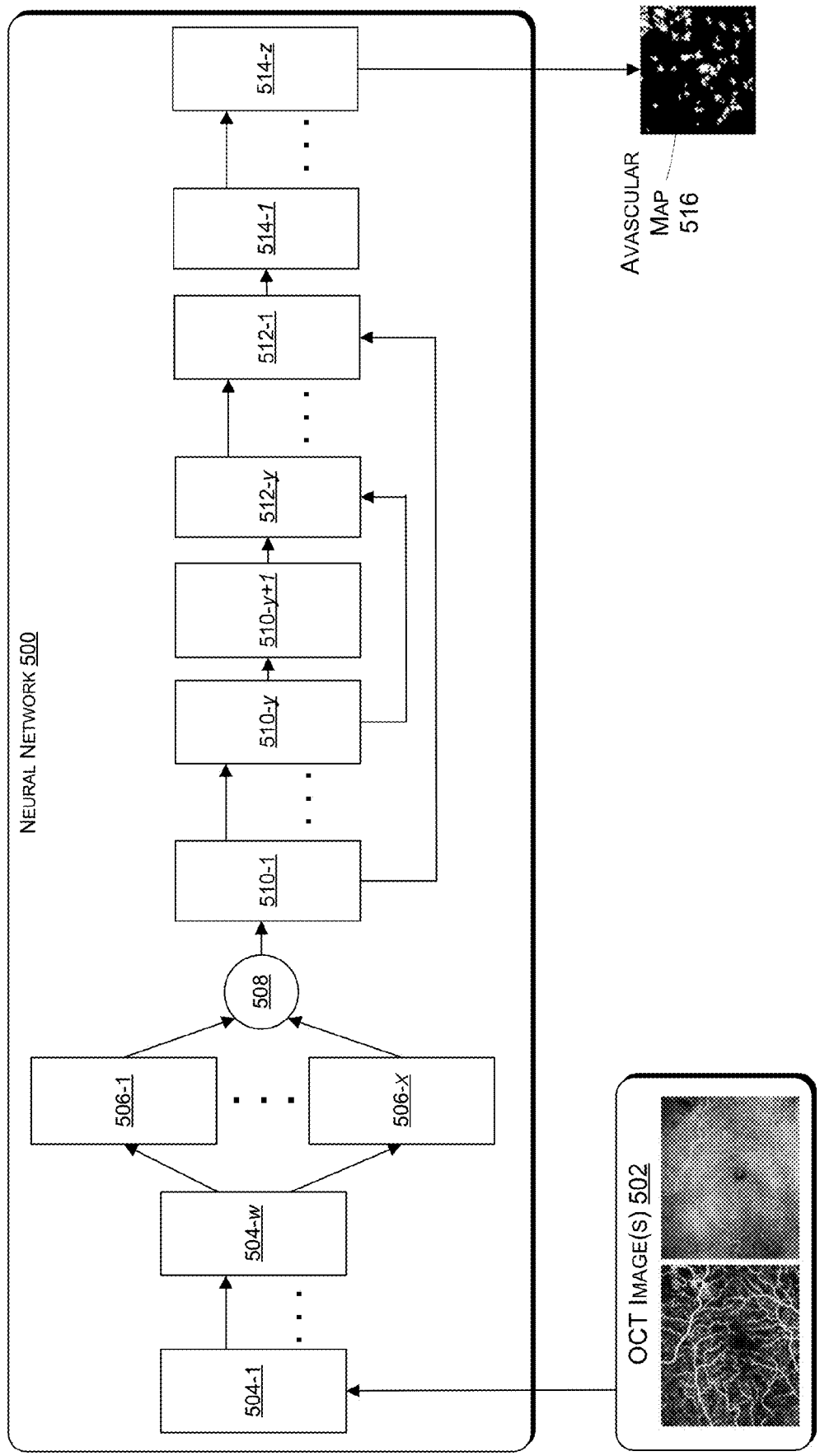
FIG. 5 illustrates an example of a neural network configured to generate an avascular map from at least one OCT image.

FIG. 5 illustrates an example of a neural network 500 configured to generate an avascular map 510 from at least one OCT image 502. In some cases, the neural network 500 can correspond to the neural network 110 described above with reference to FIG. 1.

The neural network 500 may include a first set of blocks including first through wth blocks 504-1 to 504-w, which are arranged in series, wherein w is a positive integer. The first to wth blocks 504-1 to 504-w may include one or more convolution layers.

The neural network 500 may include a second set of blocks including first through xth blocks 506-1 to 506-x, which are arranged in parallel, wherein x is a positive integer>1. In some cases, each one of the first through xth 506-1 to 506-x blocks includes at least one convolution layer. Multiple blocks among the first through xth blocks 506-1 to 506-x may perform atrous convolution operations with different dilation rates. For instance, the first block 506-1 may be configured to convolve or cross-correlate a first filter with an input image using a first dilation rate, a second block among the blocks 506-1 to 506-x may be configured to convolve or cross-correlate a second filter with an input image using a second dilation rate, wherein the first dilation rate may be different than the second dilation rate. The different dilation rates applied by the second set of blocks may be used to identify features with different sizes within the OCT image(s) 502. The first through xth blocks 506-1 to 506-x may be collectively referred to as a "multi-scale block."

A merge block 508 may receive x respective outputs from the first to xth blocks 506-1 to 506-x. The merge block 508 may combine the outputs of the first to xth blocks 506-1 to 506-x. The merge block 508 may generate a merged image based on the x outputs. For example, the merge block 508 may generate the merged image by concatenating the outputs.

First to y+1th encoder blocks 510-1 to 510-y+1 may process the merged image, wherein y is a positive integer. The first to y+1th encoder blocks 510-1 to 510-y+1 may be arranged in series. In some cases, the first to y+1th encoder blocks 510-1 to 510-y+1 may include one or more convolution layers. Collectively, the first to y+1th encoder blocks 510-1 to 510-y+1 may be referred to as an "encoder."

First to yth decoder blocks 512-1 to 512-y may be arranged in series and may receive the output from the y+1th encoder block 510+y+1. The first to yth decoder blocks 512-1 to 512-y may include one or more convolution layers. In various implementations, the first to yth decoder blocks 512-1 to 512-y may have cross-layer connections with respective encoder blocks among the first to yth encoder blocks 510-1 to 510-y. For example, the first decoder block 512-1 may receive an output from the first encoder block 510-1, as well as an output from a decoder block or an encoder block immediately preceding the first decoder block 512-1 in the neural network 500. Similarly, the yth decoder block 512-y may receive an output from the yth encoder block 510-y as well as from the y+1th encoder block 510-y+1, which immediately precedes the yth decoder block 512-y in the neural network 500. Each one of the decoder blocks 512-1 to 512-y may therefore receive at least two input images. According to various implementations, each one of the decoder blocks 512-1 to 512-y may merge (e.g., concatenate) its multiple input images. The first to yth decoder blocks 512-1 to 512-y may collectively be referred to as a "decoder."

The neural network 500 may further include first to zth output blocks 514-1 to 514-z, which may be arranged in series, wherein z is a positive integer. The first to zth output blocks 514-1 to 514-z receive the output from the decoder and may be configured to generate the avascular map 516 based on the output from the decoder. According to various implementations, the first to zth output blocks 514-1 to 514-z may include one or more convolution layers.

According to various implementations, one or more of the blocks 504-1 to 504-w, 506-1 to 506-x, 508, 510-1 to 510-y+1, 512-1 to 512-y, and/or 514-1 to 514-z within the neural network 500 include one or more of convolutional (e.g., atrous convolutional) blocks, max pooling blocks, upsampling blocks, concatenation (e.g., merge) blocks, or batch normalization blocks. According to some implementations, the convolutional layers and/or blocks within the neural network 500 may apply filters (also referred to ask "kernels") defined according to one or more parameters (e.g., scalar numbers) that are optimized during training. The convolutional layers and/or blocks may be configured to convolve and/or cross-correlate their respective filters with input images to generate output images. In some examples, a max pooling block may reduce the spatial size of an input to reduce the amount of parameters and computation in the overall neural network. An upsampling block may increase the spatial size of an input. A concatenation block may concatenate multiple inputs in a depth axis. A batch normalization block may reduce overfitting, which can make the neural network more stable during training. In some cases, a single block (e.g., block 506-1) illustrated in FIG. 5 may include multiple blocks arranged in series and/or parallel.

The arrows of FIG. 5 depict a direction of data flow through the neural network 500. The OCT image(s) 502 can be input into the neural network 500 at the first block in the first set 504-1. The first block in the first set 504-1 may perform an operation on the OCT image(s) 502. The result of the operation may be passed to a next block in the neural network 500. If w>1, then the first block may pass its output to a second block among the first through wth blocks 504-1 to 504-w, and so on.

The wth block 504-w may pass its output to each one of the first through xth blocks 506-1 to 506-x. The first through xth blocks 506-1 to 506-x may each, independently, perform operations on the output of the wth block 504-w. The first through xth blocks 506-1 to 506-x may pass their outputs to the merge block 508, which may combine the outputs from the first through xth blocks 506-1 to 506-x into the merged image.

The merge block 508 may pass the merged image into the first encoder block 510-1. The first encoder block 510-1 may perform an operation on the merged image. The result of the operation may be passed to a next encoder block within the neural network 500. In addition, the result of the operation may be further passed to the first decoder block 512-1. The y+1th encoder block 510-y+1 may receive the output from the yth encoder block 510-y in the encoder, may perform an operation on the output from the yth encoder block 510-y, and may pass the result of the operation to the yth decoder block 512-y. The yth decoder block 512-y may combine (e.g., concatenate) the output from the yth encoder block 510-y and the y+1th encoder block 510-y+1, perform an operation on the combined image, and pass the result of the operation to the next block in the neural network 500. In various cases, the series of zth output blocks 514-1 to 514-z may perform a series of operations on the output from the decoder, thereby generating the avascular map 516.

Figure 6:
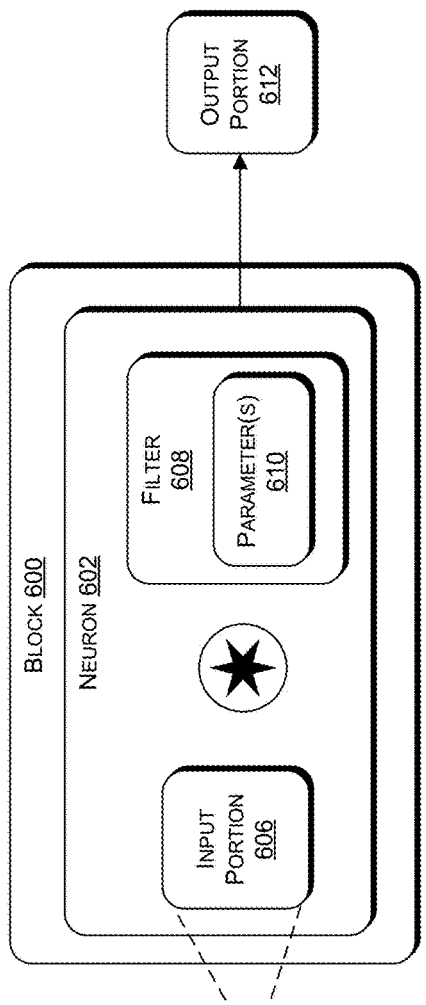
FIG. 6 illustrates an example of a convolutional block in a neural network.

FIG. 6 illustrates an example of a convolutional block 600 in a neural network. In some examples, the block 600 can represent any of the blocks 504-1 to 504-w, 506-1 to 506-x, 510-1 to 510-y+1, 512-1 to 512-y, or 514-1 to 514-z, which are described above with reference to FIG. 5.

The convolutional block 600 may include multiple neurons, such as neuron 602. In some cases, the number of neurons may correspond to the number of pixels in at least one input image 604 input into the block 600. Although one neuron is illustrated in FIG. 6, in various implementations, block 600 can include multiple rows and columns of neurons.

In particular examples, the number of neurons in the block 600 may be less than or equal to the number of pixels in the input image(s) 604. In some cases, the number of neurons in the block 600 may correspond to a stride of neurons in the block 600. In some examples in which first and second neurons are neighbors in the block 600, the stride may refer to a lateral difference in an input of the first neuron and an input of the second neuron. For example, a stride of one pixel may indicate that the lateral difference, in the input image(s) 604, of the input of the first neuron and the input of the second neuron is one pixel.

Neuron 602 may accept an input portion 606. The input portion 606 may include one or more pixels in the input image(s) 604. A size of the input portion 606 may correspond to a receptive field of the neuron 602. For example, if the receptive field of the neuron 602 is a 3×3 pixel area, the input portion 606 may include at least one pixel in a 3×3 pixel area of the input image(s) 604. The number of pixels in the receptive field that are included in the input portion 606 may depend on a dilation rate of the neuron 602.

In various implementations, the neuron 602 may convolve (or cross-correlate) the input portion 606 with a filter 608. The filter 608 may correspond to at least one parameter 610. In some examples, the parameter(s) 610 are set during training of a neural network including the block 600. The result of the convolution (or cross-correlation) performed by the neuron 602 may be output as an output portion 612. In some cases, the output portion 612 of the neuron 602 is further combined with outputs of other neurons in the block 600. The combination of the outputs may, in some cases, correspond to an output of the block 600.

Figure 7C:
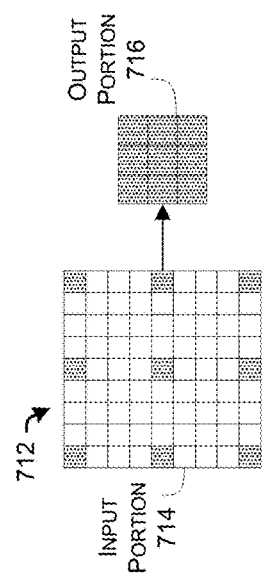
FIGS. 7A to 7C illustrate examples of dilation rates.
Figure 7B:
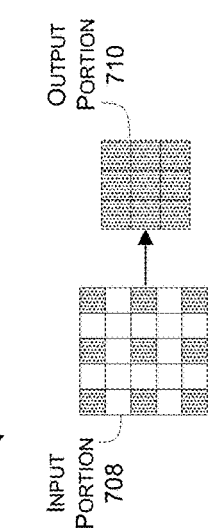
Figure 7A:
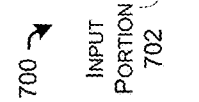

FIGS. 7A to 7C illustrate examples of dilation rates. In various implementations, the dilation rates illustrated in FIGS. 7A to 7C can be utilized by a neuron, such as the neuron 602 illustrated in FIG. 6.

FIG. 7A illustrates a transformation 700 of a 3×3 pixel input portion 702 into a 3×3 pixel output portion 704. The dilation rate of the transformation 700 is equal to 1. The receptive field of a neuron utilizing the transformation 700 is a 3×3 pixel area.

FIG. 7B illustrates a transformation 706 of a 3×3 pixel input portion 708 into a 3×3 pixel output portion 710. The dilation rate of the transformation 700 is equal to 2. The receptive field of a neuron utilizing the transformation 706 is a 5×5 pixel area.

FIG. 7C illustrates a transformation 712 of a 3×3 pixel input portion 714 into a 3×3 pixel output portion 716. The dilation rate of the transformation 712 is equal to 4. The receptive field of a neuron utilizing the transformation 700 is a 9×3 pixel area.

Figure 8:
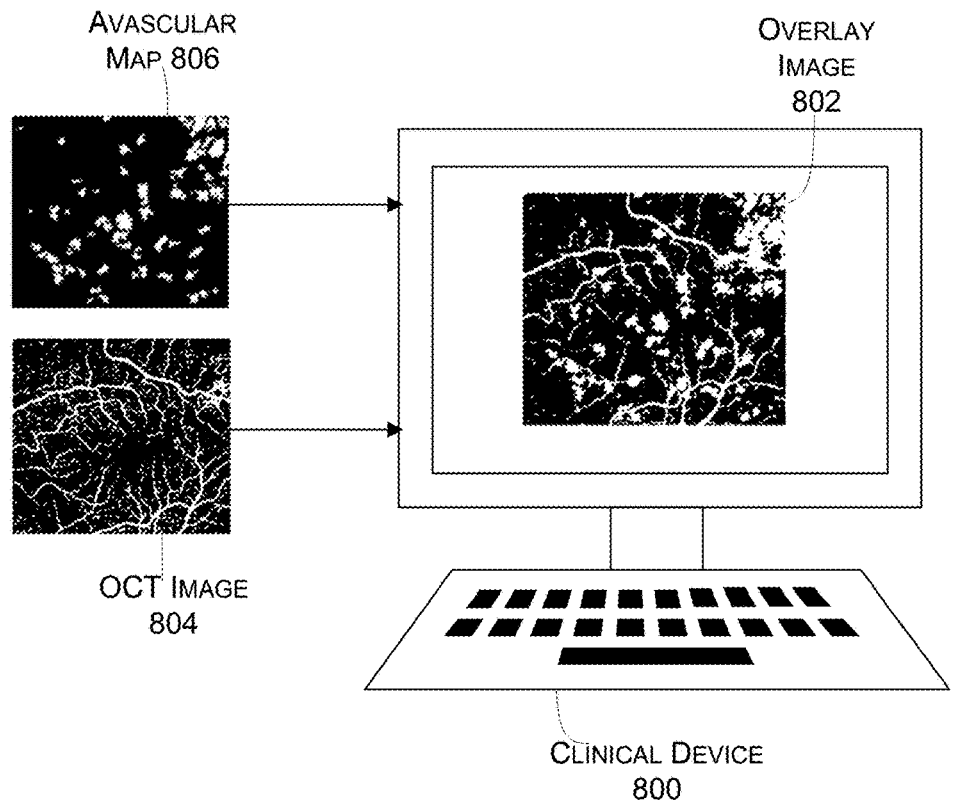
FIG. 8 illustrates an example of a clinical device configured to display an OCTA image overlaid with a corresponding avascular map.

FIG. 8 illustrates an example of a clinical device 800 configured to display an overlay image 802. In some cases, the clinical device 800 can correspond to the clinical device(s) 112 described above with reference to FIG. 1. Examples of the clinical device 800 can include a smart phone, a tablet computer, a personal computer, a holographic display, or the like.

The overlay image 802 may include an OCT image 804 overlaid with an avascular map 806. The OCT image 804 may be an OCTA image, in some cases. The avascular map 806, in certain examples, may be generated by a trained neural network (e.g., neural network 110) in response to receiving the OCT image 804 as an input.

In certain examples, the OCT image 804 is generated by an OCT device (e.g., an OCT angiography device) that corresponds to the clinical device 800. In some cases, the OCT device is part of the clinical device 800. In certain implementations, the OCT device interfaces with the clinical device 800, such that the clinical device 800 can receive the OCT image 804 from the OCT device. In some cases, the OCT device can transmit the OCT image 804 to a prediction system (e.g., prediction system 102), which may, in turn, transmit the OCT image 804 to the clinical device 800 with the avascular map 806

In particular implementations, the avascular map 806 is a binary image. The overlay image 802 may include portions of the OCT image 804 that correspond to vascular areas of the avascular map 806. The overlay image 802 may further include portions of the avascular map 806 that correspond to avascular areas of the avascular map 806. Accordingly, the clinical device 800 can display the vascular regions of the OCT image 804 while emphasizing avascular regions depicted by the OCT image 804. A clinician may be able to diagnose complications of DR more efficiently using the overlay image 802 than by using the OCT image 804 alone.

Figure 9:
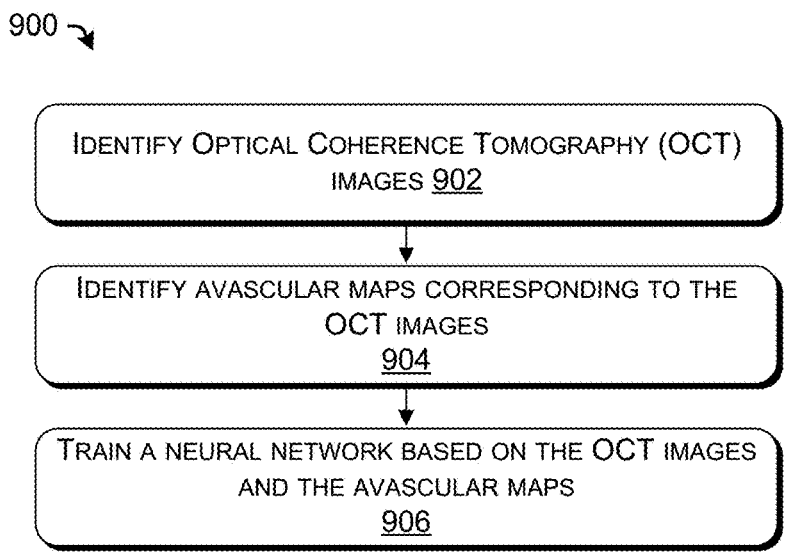
FIG. 9 illustrates an example of a process for training a neural network based on OCT images and avascular maps.

FIG. 9 illustrates an example of a process 900 for training a neural network based on OCT images and avascular maps. In some implementations, the process 900 can be performed by a prediction system (e.g., prediction system 102), a trainer (e.g., trainer 104), or a combination thereof.

At 902, OCT images may be received. The OCT images may be captured from multiple eyes. According to particular examples, the OCT images may be captured from multiple eyes with different disease severities. In some cases, the OCT images may be captured by multiple imaging devices. The OCT images may include OCTA images, OCT reflectance images, or a combination thereof.

At 904, avascular maps corresponding to the OCT images may be identified. In some cases, the avascular maps may be received from the same or different entity(s) that transmitted the OCT images. The avascular maps can be binary images identifying avascular areas of the OCT images. In some cases, the avascular maps are generated by devices under direction of one or more experts, who may individually select pixels of the OCT images corresponding to avascular areas via one or more user interfaces. If multiple experts have different opinions about whether a particular pixel corresponds to a vascular area or an avascular area, the pixel is defined, in an avascular map, as whatever a majority of the experts believes the pixel corresponds to.

At 906, a neural network may be trained based on the OCT images and the avascular maps. In various implementations, parameters in the neural network (e.g., scaling factors and/or values in filters utilized by neurons in the neural network) can be optimized in the neural network according to a loss function. By optimizing the parameters, the neural network can be trained to effectively transform the OCT images into the avascular maps with minimal loss. The trained neural network may then be used to transform new OCT images into new avascular maps.

Figure 10:
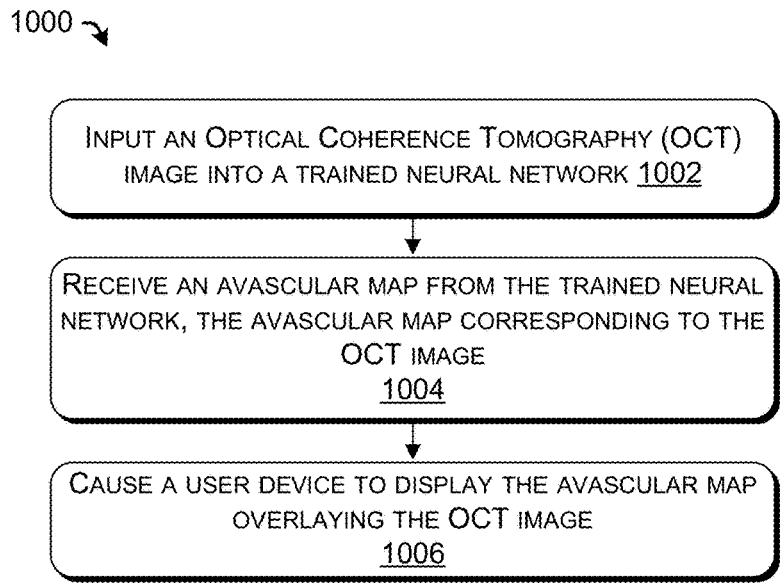
FIG. 10 illustrates an example of a process for utilizing a trained neural network by inputting an OCT image into the trained neural network.

FIG. 10 illustrates an example of a process 1000 for utilizing a trained neural network by inputting an OCT image into the trained neural network. In various implementations, the process 1000 can be performed by a prediction system (e.g., prediction system 102), a neural network (e.g., neural network 110), or a combination thereof.

At 1002, an OCT image is input into a trained neural network. The OCT image may include at least one OCTA image, at least one OCT reflectance image, or a combination thereof. The OCT image may depict at least one portion of at least one eye of a patient. In some cases, the OCT image is received from a clinical device that has captured the OCT image or is in communication with a device that has captured the OCT image. The OCT image may be input into a first block of the trained neural network. In response, the neural network may process the OCT image.

At 1004, an avascular map may be received from the trained neural network. The avascular map may correspond to the OCT image input at 1002. In some cases, the avascular map can be a probability map, which indicates the probability that each pixel in the OCT image corresponds to an avascular area. In certain cases, the avascular map is a binary image that indicates whether each pixel has a greater than a threshold percentage probability (e.g., >50% probability) of depicting an avascular area.

At 1006, the process 1000 may include causing a user device to display the avascular map overlaying the OCT image. In some implementations, the avascular map and/or the OCT image may be transmitted to the user device. An instruction to output the avascular map overlaying the OCT image may be transmitted to the user device. In some cases, the user device may be a clinical device that is operated by a clinician. Accordingly, the avascular map overlaying the OCT image may assist the clinician with diagnosing complications of DR in the patient.

Figure 11:
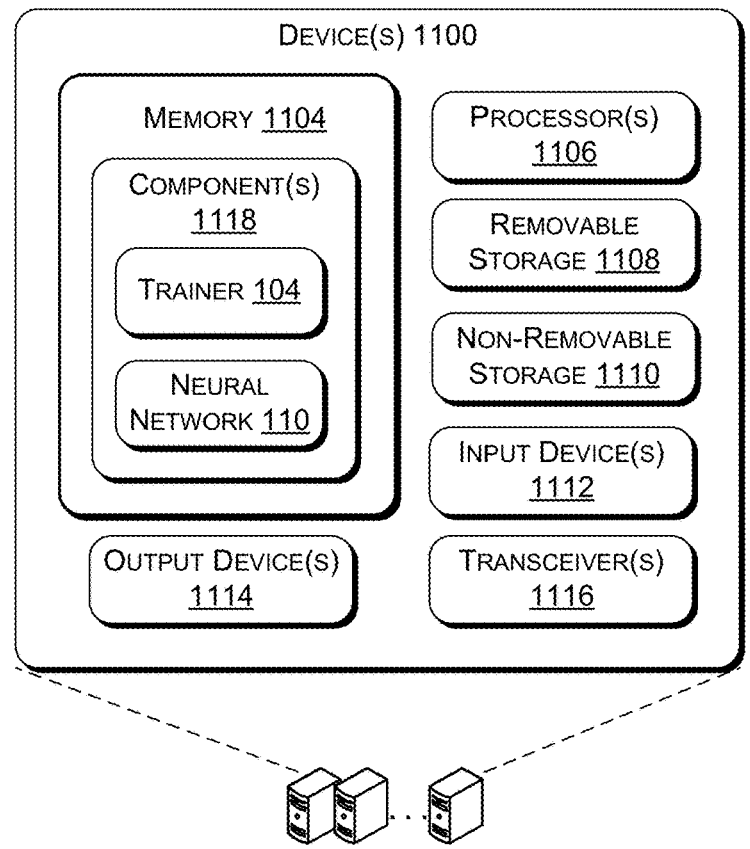
FIG. 11 illustrates an example system including at least one device for performing any of the functions described herein.

FIG. 11 illustrates at least one example device 1100 for performing any of the functions described herein. In some implementations, some or all of the functionality discussed in connection with FIGS. 1-10 can be implemented in the device(s) 1100. Further, the device(s) 1100 can be implemented as one or more server computers, a network element on a dedicated hardware, as a software instance running on a dedicated hardware, or as a virtualized function instantiated on an appropriate platform, such as a cloud infrastructure, and the like. It is to be understood in the context of this disclosure that the device(s) 1100 can be implemented as a single device or as a plurality of devices with components and data distributed among them.

As illustrated, the device(s) 1100 comprise a memory 1102. In various embodiments, the memory 1102 is volatile (such as RAM), non-volatile (such as ROM, flash memory, etc.) or some combination of the two.

The memory 1102 may store, or otherwise include, various components 1104. In some cases, the components 1104 can include objects, modules, and/or instructions to perform various functions disclosed herein. The components 1104 can include methods, threads, processes, applications, or any other sort of executable instructions. The components 1104 can include files and databases. For example, the components 1104 may include the trainer 104 and neural network 110 described above.

In some implementations, at least some of the components 1104 can be executed by processor(s) 1106 to perform operations. In some embodiments, the processor(s) 1106 includes a Central Processing Unit (CPU), a Graphics Processing Unit (GPU), or both CPU and GPU, or other processing unit or component known in the art.

The device(s) 1100 can also include additional data storage devices (removable and/or non-removable) such as, for example, magnetic disks, optical disks, or tape. Such additional storage is illustrated in FIG. 1100 by removable storage 1108 and non-removable storage 1110. Tangible computer-readable media can include volatile and nonvolatile, removable and non-removable media implemented in any method or technology for storage of information, such as computer readable instructions, data structures, program modules, or other data. The memory 1102, removable storage 1108 and non-removable storage 1110 are all examples of computer-readable storage media. Computer-readable storage media include, but are not limited to, RAM, ROM, EEPROM, flash memory or other memory technology, CD-ROM, Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the device(s) 1100. Any such tangible computer-readable media can be part of the device(s) 1100.

The device(s) 1100 also can include input device(s) 1112, such as a keypad, a cursor control, a touch-sensitive display, voice input device, etc., and output device(s) 1114 such as a display, speakers, printers, etc. For instance, the device(s) 110 may include a screen by which an avascular map overlaying an OCTA image can be displayed to a clinician.

As illustrated in FIG. 11, the device(s) 1100 can also include one or more wired or wireless transceiver(s) 1116. For example, the transceiver(s) 1116 can include a Network Interface Card (NIC), a network adapter, a Local Area Network (LAN) adapter, or a physical, virtual, or logical address to connect to the various base stations or networks contemplated herein, for example, or the various user devices and servers. The transceiver(s) 1116 can include any sort of wireless transceivers capable of engaging in wireless, Radio Frequency (RF) communication. The transceiver(s) 1116 can also include other wireless modems, such as a modem for engaging in Wi-Fi, WiMAX, Bluetooth, or infrared communication.

Figure 12:
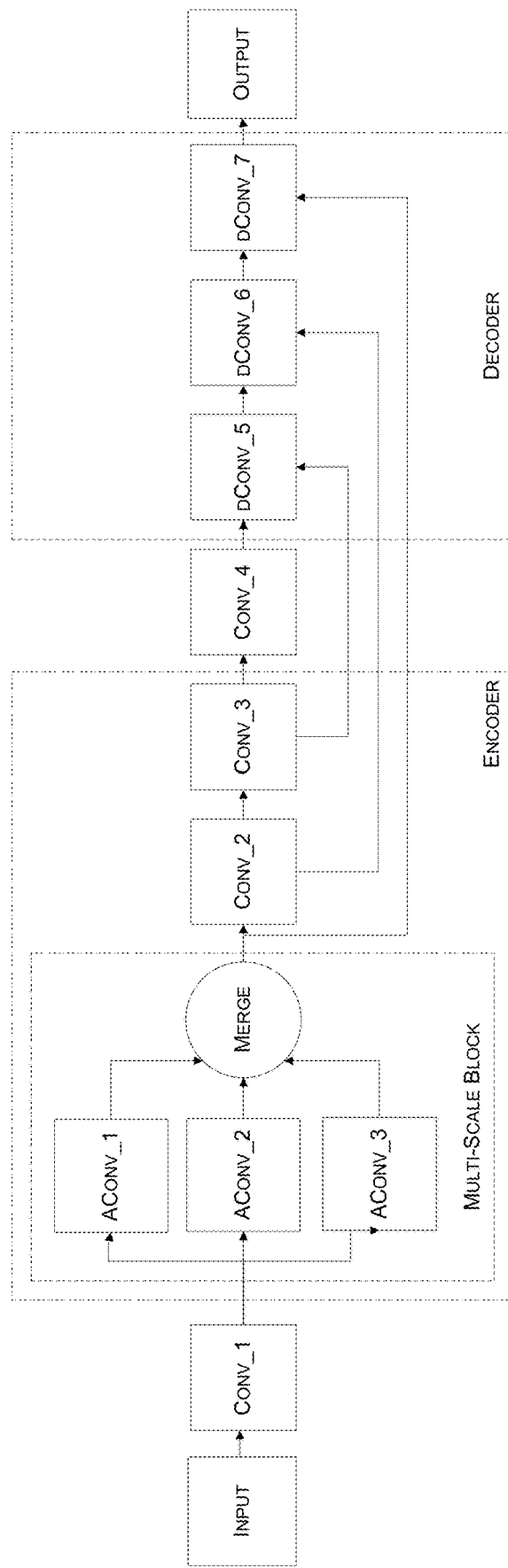
FIG. 12 illustrates an example of a neural network configured to generate an avascular map from at least one OCT image.

FIG. 12 illustrates an example of a neural network configured to generate an avascular map from at least one OCT image. In some implementations, the neural network illustrated in FIG. 12 can correspond to the neural network 110 illustrated above with reference to FIG. 1, the neural network 500 described above with reference to FIG. 5, or a combination thereof. In FIG. 12, each block or circle in the figure represents a set of operations.

The neural network illustrated in FIG. 12 has two functional modules: an encoder and a decoder. Each of the encoder and the decoder may include multiple blocks, such as convolutional blocks.

In the encoder, a multi-scale block can be used to extract features from multiple scale of input images. For example, the multi-scale block can account for input images provided from different OCT imaging devices. The multi-scale block contains 3 paralleling convolution blocks. Each of the parallel convolution blocks in the multi-scale block may have a different dilation rate of its convolution kernel.

The merge layer following the parallel convolution blocks may concatenate the outputs of the previous parallel convolution blocks in a depth direction. Skip connections can be used to connect the corresponding blocks between the encoder blocks and the decoder blocks.

A training set (e.g., the training data 200 described above with reference to FIG. 2) can be used to train the neural network of FIG. 12. The training set may contain Superficial Vascular Complex (SVC) angiograms (e.g., the OCTA image 302 of FIG. 3), corresponding reflectance images (e.g., the OCT reflectance image 304 of FIG. 3) and ground truth avascular maps (e.g., the avascular map 306 of FIG. 4). In the training phrase, both SVC angiogram and reflectance images can be used. The reflectance image can help the neural network suppress the effects of non-target artifacts. The ground truth map can be derived from manually delineations of the SVC angiogram and/or the reflectance images by multiple (e.g., three) experts individually. In some cases, the mean of these delineations can be used as the final ground truth map. In certain examples, the final ground truth map is defined according to a pixel-wise majority vote of the delineations.

After training, the neural network can be used to detect the nonperfusion area in new data. In order to evaluate the performance of the neural network on different qualities of image and different degrees of disease, test data was divided into two groups. A first group contained 4 different image qualities which were measured by SSI (Signal Strength Index), 5 eyes for each image quality, for a total of 20 eyes. Another group contained 3 different degree of DR (A, severe DR. B1, mild DR. B2, and DR without nonperfusion) and healthy control, 5 eyes for each subgroup, 20 eyes in total. Both groups were used to validate the neural network according to various evaluations.

In some cases, the neural network outputs probability maps, wherein each element of a probability map indicates a probability that a particular pixel in an original OCT image depicts an avascular area. In some cases, the neural network outputs probability maps with a value range of 0 to 1. A threshold can be set to distinguish the nonperfusion area from the background to compare with manual delineation map. For example, a pixel can be defined as an avascular region when an element of a probability map indicates that the pixel is at least 50% likely to depict an avascular area.

Example 1—A Neural Network for Automated Detection of Avascular Area in OCT Angiography This example demonstrates results of a deep learning architecture, known as MEDnet, with a powerful multi-scale feature extraction capability incorporated to segment the non-perfusion area in 6×6 $mm^2$ angiograms of superficial retinal flow.

2. Methods

The segmentation task includes pixel-wise classification into two classes: vascular versus avascular area. In this example, the CNN (also known as MEDnet) is a fully convolutional network containing a layer with multi-scale atrous (i.e., dilated) convolutions of different dilation rates aimed at generating feature maps sensitive to the different scales of non-perfusion. This was selected because the size of avascular areas can be variable and because pixels contained in them might encounter noise in their vicinity, potentially confounding the classification process. The inclusion of this type of layer also helps to reduce the size of the network and, consequently, the number of model parameters to only 890,000.

2.1 Data Acquisition

Figures 13A, 13B:
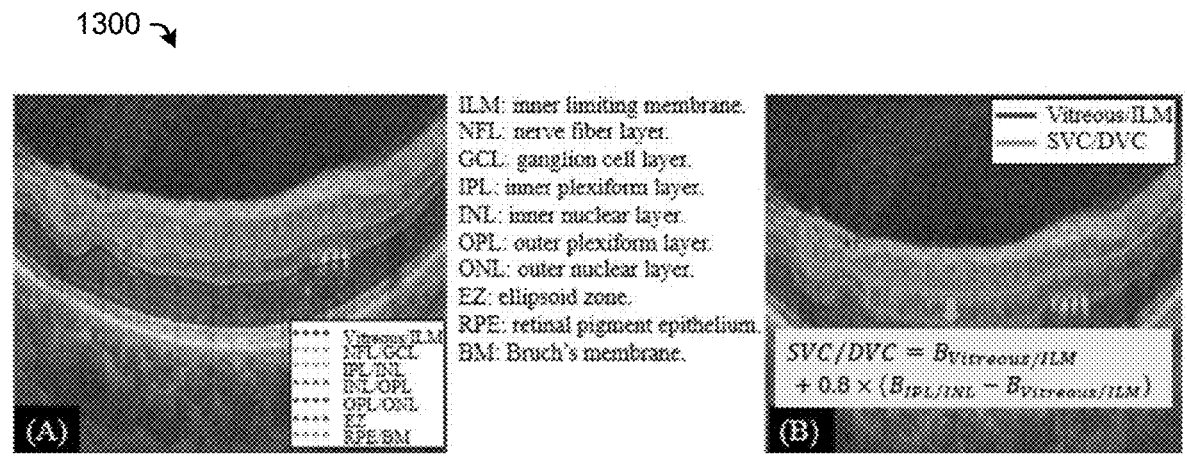
FIGS. 13A to 13F illustrate example image processing for the generation of en face visualization of the OCT tissue reflectance and OCT angiography of the superficial vascular complex (SVC) slab.
Figures 13C, 13D:
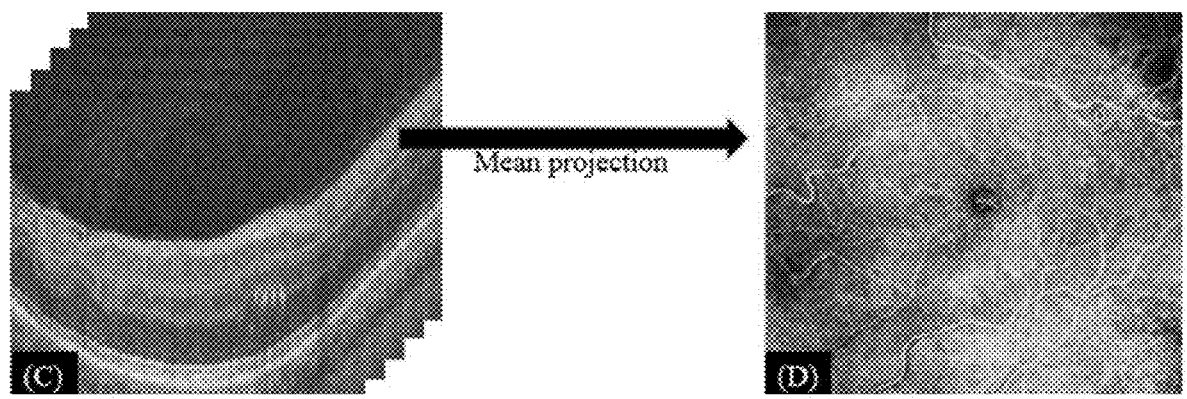
Figures 13E, 13F:
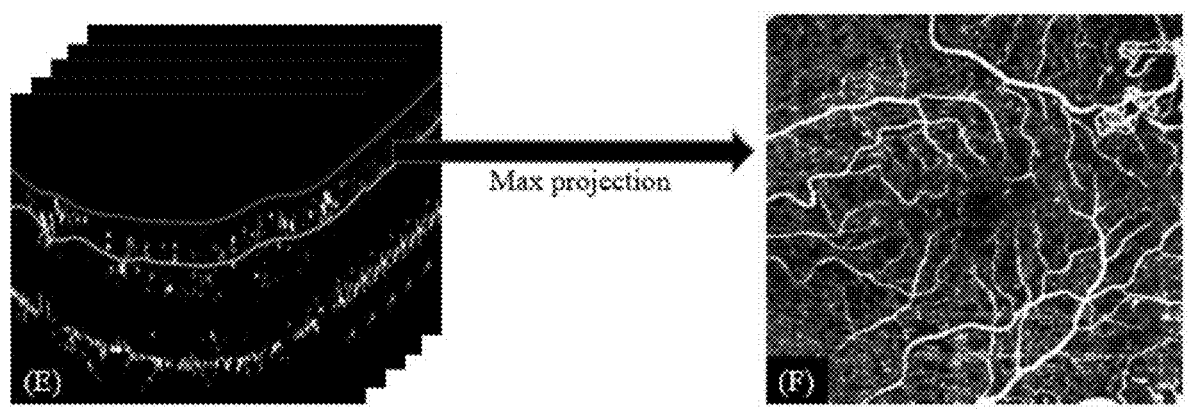

FIGS. 13A to 13F illustrate example image processing for the generation of en face visualization of the OCT tissue reflectance and OCT angiography of the superficial vascular complex (SVC) slab. FIG. 13A illustrates example results of the layer segmentation on a B-scan, delineating seven retinal interfaces. FIG. 13B illustrates examples of the SVC boundaries. FIGS. 13C and 13D illustrate an example of the mean projection of the OCT data within the SVC produce an en face visualization of the retinal reflectivity. FIGS. 13E and 13F illustrate an example of the maximum projection of the OCTA data within the SVC slab that produces an en face image of the superficial retinal flow in the macular region. For reference, in FIGS. 13A to 13F, the term "SVC" refers to superficial vascular complex, the term "DVC" refers to deep vascular complex, and the term "B" refers to boundary.

OCTA scans were acquired over a 6×6 mm² region using a 70-kHz OCT commercial AngioVue system (RTVue-XR; Optovue, Inc.) centered at 840 nm with a full-width half maximum bandwidth of 45 nm. Two repeated B-scans were taken at each of 304 raster positions and each B-scan comprised 304 A-lines. The commercial version of the Splitspectrum Amplitude Decorrelation Angiography (SSADA) algorithm was used to calculate OCTA data. See Jia et al., OPT. EXPRESS 20(4), 4710-25 (2012) (describing an example of an SSADA algorithm). Then, the retinal layers (FIG. 13A) and the boundaries of retinal vascular plexuses (FIG. 13B) were segmented using a graph search method. See Zhang et al., BIOMED. OPT. EXPRESS 6(12), 4661-75 (2015) (describing an example of a graph search method). The reflectance (FIGS. 13C and 13D) and angiographic images (FIGS. 13E and 13F) of the Superficial Vascular Complex (SVC) angiogram were obtained by average and maximum projection of the corresponding volumetric data within the slab of interest, respectively.

2.2 Network Architecture

Figure 14:
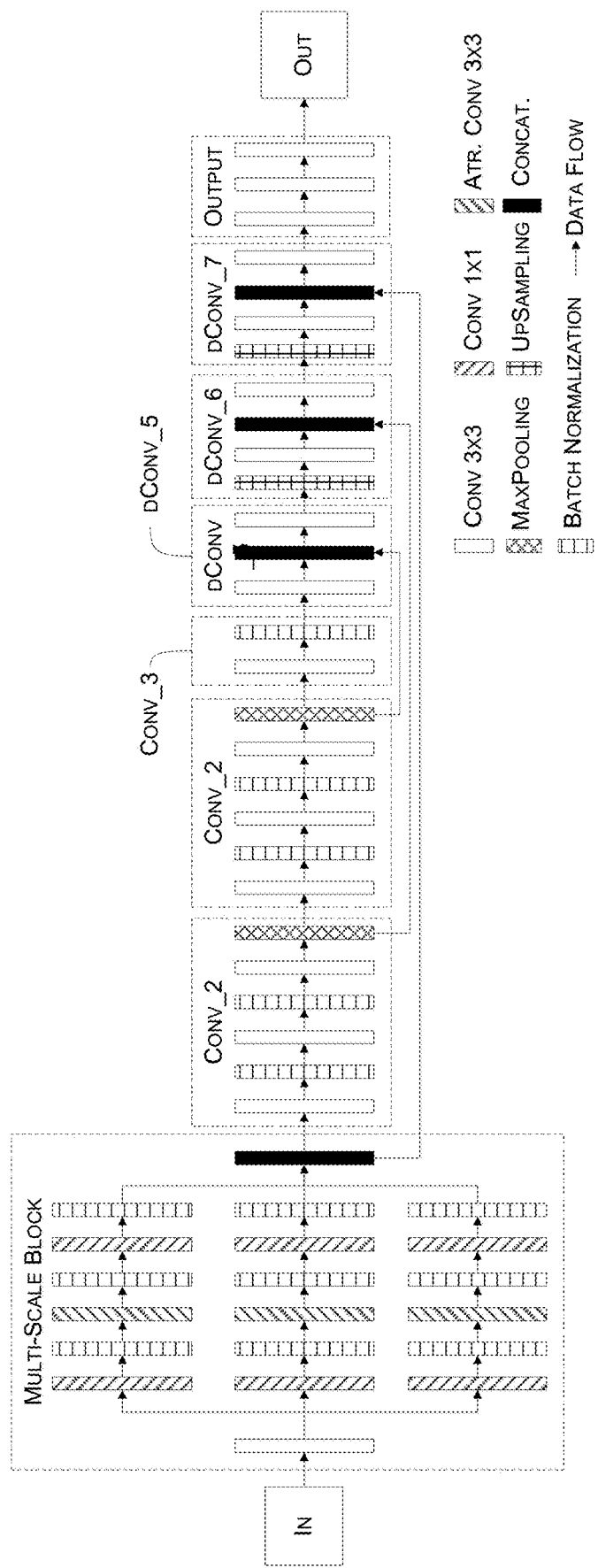
FIG. 14 illustrates a network architecture of Multi-scaled Encoder-Decoder neural network (MEDnet).

FIG. 14 illustrates a network architecture of the MEDnet architecture utilized in this example. As illustrated in FIG. 14, the network can be divided into two parts, encoder and decoder. In the encoder section, a multi-scale block formed by three atrous convolutions with different dilation rates (See FIGS. 7A to 7C) was employed to extract multi-scale features from input images. In particular, a first block in the multi-scale block used a dilation rate of 1, a second block in the multi-block used a dilation rate of 2, and a third block in the multi-scale block used a dilation rate of 4. The outputs of the blocks containing the atrous convolutions were concatenated across the depth dimension into a single tensor before being fed to the next layer. After that, each "Cony block" included successive convolutions with a 3×3-pixel kernel followed by a batch normalization stage and a max pooling operation. The batch normalization was applied to accelerate deep network training and reduce overfitting. The role of the convolution blocks (conv_2 and conv_3) was to encode the image whereas dConv_5, dConv_6 and dConv_7 made up the decoder. The decoder blocks received the outputs of encoder blocks through across-layer connections that allowed the resolution of the output to be preserved and stabilized the training phase. The across-layer connections are also used in U-Net-based networks. See generally Ronneberger et al., U-Net: Convolutional Networks for Biomedical Image Segmentation, in MEDICAL IMAGE COMPUTING AND COMPUTER-ASSISTED INTERVENTION-MICCAI 2015, N. Navab, J. Hornegger, W. M. Wells, and A. F. Frangi, eds. (Springer International Publishing, Cham, 2015), pp. 234-41 & Roy et al., BIOMED. OPT. EXPRESS 8(8), 3627-42 (2017). A Sigmoid activation function was used in the output layer for pixel-wise classification.

2.3 Network Parameters

The parameters of each layer are listed in Table 1. In the example, convolutional layers had kernels of size 3×3 pixels except for the 1×1 pixel kernels used for the convolution operations included in the atrous convolution block, which reduce the depth of the output, and hence, the computational cost. The default atrous convolution itself had a 3×3-pixel kernel size. The dilation rate n means that n-1 zeros have been padded in between the rows and columns of the original filter (See FIGS. 7A to 7C).

TABLE 1

Parameters of MEDnet's layers

| Blocks | Layers | Filter size | Stride | Dilation rate | Filter number | Padding mode | Activation |
|---|---|---|---|---|---|---|---|
| Conv_1 | Convolution | 3 × 3 | 1 | 1 | 64 | same | ReLU |
| AConv_ (1, 2, 3) | Convolution | 1 × 1 | 1 | 1 | 32 | same | ReLU |
| | Batch Normalization | — | — | — | — | — | — |
| | Convolution | 3 × 3 | 1 | (1, 2, 4) | 64 | same | ReLU |
| | Batch Normalization | — | — | — | — | — | — |
| | Convolution | 1 × 1 | 1 | 1 | 64 | same | ReLU |
| | Batch Normalization | — | — | — | — | — | — |
| Merge | Merge_concat | Concatenate the outputs of AConv (1, 2, 3) | | | | | |
| Conv_ (2, 3) | Convolution | 3 × 3 | 1 | 1 | 32 | same | ReLU |
| | Batch Normalization | — | — | — | — | — | — |
| | Convolution | 3 × 3 | 1 | 1 | 64 | same | ReLU |
| | Batch Normalization | — | — | — | — | — | — |
| | Convolution | 3 × 3 | 1 | 1 | 64 | same | ReLU |
| | Batch Normalization | — | — | — | — | — | — |
| | MaxPooling | 2 × 2 | 2 | — | — | valid | — |
| Conv_4 | Convolution | 3 × 3 | 1 | 1 | 64 | same | ReLU |
| | Batch Normalization | — | — | — | — | — | — |
| dConv_ 5 | Convolution | 3 × 3 | 1 | 1 | 64 | same | ReLU |
| | Batch Normalization | — | — | — | — | — | — |
| | Merge_concat | Concatenate the outputs of Batch Normalization and Conv_3 | | | | | |
| | Convolution | 3 × 3 | 1 | 1 | 64 | same | ReLU |
| dConv_ (6, 7) | UpSampling | 2 × 2 | — | — | — | — | — |
| | Convolution | 3 × 3 | 1 | 1 | 64 | same | ReLU |
| | Batch Normalization | — | — | — | — | — | — |
| | Merge_concat | Concatenate the outputs of Batch Normalization and (Conv_2, Merge) | | | | | |
| | Convolution | 3 × 3 | 1 | 1 | 64 | same | ReLU |
| Output | Convolution | 3 × 3 | 1 | 1 | 32 | same | ReLU |
| | Convolution | 3 × 3 | 1 | 1 | 16 | same | ReLU |
| | Convolution | 3 × 3 | 1 | 1 | 1 | same | sigmoid |

2.4 Training 2.4.1 Training Data

The training data included en face angiograms of the SVC (e.g., the OCTA image 302 described above with reference to FIG. 3), the OCT reflectance of the same slab (e.g., the OCT reflectance image 304 described above with reference to FIG. 3), and the corresponding manually segmented non-perfusion binary map (e.g., the avascular map 302 described above with reference to FIG. 4). During the imaging process, occlusion of the back-scattered signal by anterior objects (eyelashes, vitreous floaters, pupil vignetting) might cause loss of the flow signal at the corresponding position and this may be responsible of pixel misclassification. In order to prevent the potentially confounding impact of shadowed areas, the corresponding OCT reflectance images were incorporated in the training stage. Three expert graders manually delineated non-perfusion area maps, and the ground truth maps were generated by the pixelwise vote on the three manually labeled maps. In order to alleviate the limitations associated with a small training data set, data augmentation techniques (see, e.g., Chen et al., IEEE TRANS. PATTERN ANAL. MACH. INTELL. 40(4), 834-48 (2018); Chen et al., CoRR abs/1706.05587 (2017); & Ng et al., *Feature selection, L1 vs. L2 regularization, and rotational invariance*, presented at the Proceedings of the twenty-first international conference on Machine learning, Banff, Alberta, Canada 2004) (flipping, noise addition, and rotation) were used to increase the amount of training data.

2.4.2 Loss Function and Optimizer

The loss function used in training stage of the example was the mean square error (Eq. (1)) with L2 regularization loss (Eq. (2)). Mean square error can provide the distance between the actual label and the predicted value whereas L2 regularization loss can measure the scale of the model and avoid overfitting. Ng et al. (2004). The total loss is the sum of the mean square error and L2 regularization loss (Eq. (3)).

$$E = \frac{1}{N}\sum_{i=1}^{N}(y_i - \hat{y}_i)^2 \quad (1)$$

$$R = \sum_{i=1}^{P} w_i^2 \quad (2)$$

$$T = E + R \quad (3)$$

where E is the mean square error, N is the number of samples in a training batch, y is the label, $\hat{y}$ is the predicted value, w is weight factor of the model, p is the total number of weight factor of the model, R is L2 regularization loss and T is the total loss.

In the training phase, the Stochastic Gradient Descent (SGD) optimizer was used with an exponential decay learning rate (Eq. (4)) to optimize the total loss.

$$l_t = l * a^{\frac{t}{s}} \quad (4)$$

where t is the training step (e.g., 250 per epoch), $l_t$ is the learning rate of tth training step, a is the decay factor, l is the initial learning rate and s is the step decay responsible for reducing the learning rate.

3. Results 3.1 Data Set

To train MEDnet in this example, OCTA volume data was collected from 76 healthy eyes and 104 eyes with DR, for a total of 180 en face angiograms of SVC (304×304 pixels). The DR eyes were arranged by disease severity into three sub-groups, severe DR (include severe nonproliferative diabetic retinopathy (NPDR) and proliferative diabetic retinopathy (PDR)), mild to moderate NPDR, and diabetes without retinopathy (Table 2). These images were annotated for the avascular area by three expert graders. The data set was randomly divided into two groups, 140 samples in the training set and 40 samples in the test set. Both training set and test set have same disease severity distribution. After application of randomized data augmentation operations (Gaussian noise (mean=0, sigma=0.5), salt and pepper (salt=0.001, pepper=0.001), horizontal flipping, vertical flipping and 180° rotation) the training set was increased to 750 images. During the training phase, 10% of the images were isolated for cross-validation.

TABLE 2

Data distribution of data set for MEDnet training (the number of subjects)

| | Patient | Eye | Gender | | Age | | | |
| | | | Male | Female | 1931-1950s | 1951-1970s | 1971-1990s | ≥1991 |
| --- | --- | --- | --- | --- | --- | --- | --- | --- |
| Healthy control | 59 | 76 | 26 | 32 | 38 | 5 | 14 | 2 |
| Severe DR | 39 | 39 | 24 | 15 | 8 | 21 | 10 | 0 |
| Mild to moderate NPDR | 31 | 31 | 10 | 21 | 12 | 18 | 1 | 0 |
| Diabetes without retinopathy | 34 | 34 | 17 | 17 | 10 | 18 | 4 | 2 |
| Total | 163 | 180 | 77 | 85 | 68 | 62 | 29 | 4 |

3.2 Implementation

MEDnet was implemented in Python 3.6 with Keras (Tensorflow-backend) and run on a PC with an Intel i7 CPU, GTX 1080Ti GPU, and 32G RAM. The hyper-parameters are specified in Table 3. Training was stopped when the accuracy rate became stable in the learning curve. In this example, the network achieved an ideal generalization performance by the 15th training epoch. The generalization performance refers to the adaptability of a machine learning algorithm to new data. Three samples per training batch were suitable for the memory space available in our hardware. A large initial learning rate (L=0.1) was used to acquire a high convergence speed. In addition, a decay factor a=0.9 and a step decay s=200 were used to obtain a smooth decline in learning rates (as provided in Table 3, below).

TABLE 3

The hyper-parameters of MEDnet

| Training epoch | Batch size (N) | Initial learning rate (L) | decay factor (a) | Step decay (S) |
| --- | --- | --- | --- | --- |
| 15 | 3 | 0.1 | 0.9 | 200 |

3.3 Performance Evaluation

To evaluate the performance of MEDnet in this example, the trained model was applied to the test set. Several factors can affect the performance of the network, principally a low OCT Signal Strength Index (SSI) and the severity of the disease. To evaluate these dependencies, the test set was separated into two groups of twenty eyes each. In the first group, images were divided into 4 different sub-groups with different SSI ranges, wherein each group contained five images (Table 4). The second group was arranged by disease severity into another four sub-groups of five scans, containing healthy control subjects, diabetes without retinopathy, mild to moderate NPDR, and severe DR respectively.

Since the output of MEDnet includes probability maps with pixel-wise values ranging from 0 to 1, a threshold of 0.5 was set to represent the non-perfusion area from the background to compare the outputs with the expert-generated manual avascular area maps. The training phase took less than 30 minutes on a single NVidia 1080ti GPU. Segment one image using MEDnet took 2.5 seconds on an Intel Core i7 CPU.

The accuracy, precision, recall and F1-score (Eq. (5)) were evaluated in Table 4, $$\text{Accuracy} = \frac{TP + TN}{TP + FP + TN + FN} \quad (5)$$

$$\text{Precision} = \frac{TP}{TP + FP}$$

$$\text{Recall} = \frac{TP}{TP + FN}$$

$$F1 = 2 \times \frac{\text{Precision} \times \text{Recall}}{\text{Precision} + \text{Recall}}$$

where TP are true positives (as in correctly predicted non-perfusion area pixels), TN are true negatives, FP are false positives and FN are false negatives. The evaluation shows that classification accuracy, precision (the ability to not classify normal areas as diseased), and F1-score deteriorated for high disease severity and low SSI, which was expected. The recall was very close to one, indicating excellent sensitivity, as almost all of the avascular area pixels were detected. The peculiarity that precision was lower than recall indicated that the inaccuracies found were mostly caused by the avascular area size being overestimated with respect to the ground truth. Because the network did not perform equally in avoiding false positive and false negative pixels, the F1-score was a better metric to describe network performance as it took both observations into consideration.

15(A4), 15(B4), 15(C4), and 15(D4) illustrate ground truth of the avascular areas generated manually by an expert grader, overlaid on the en face angiograms.

Figure 15:
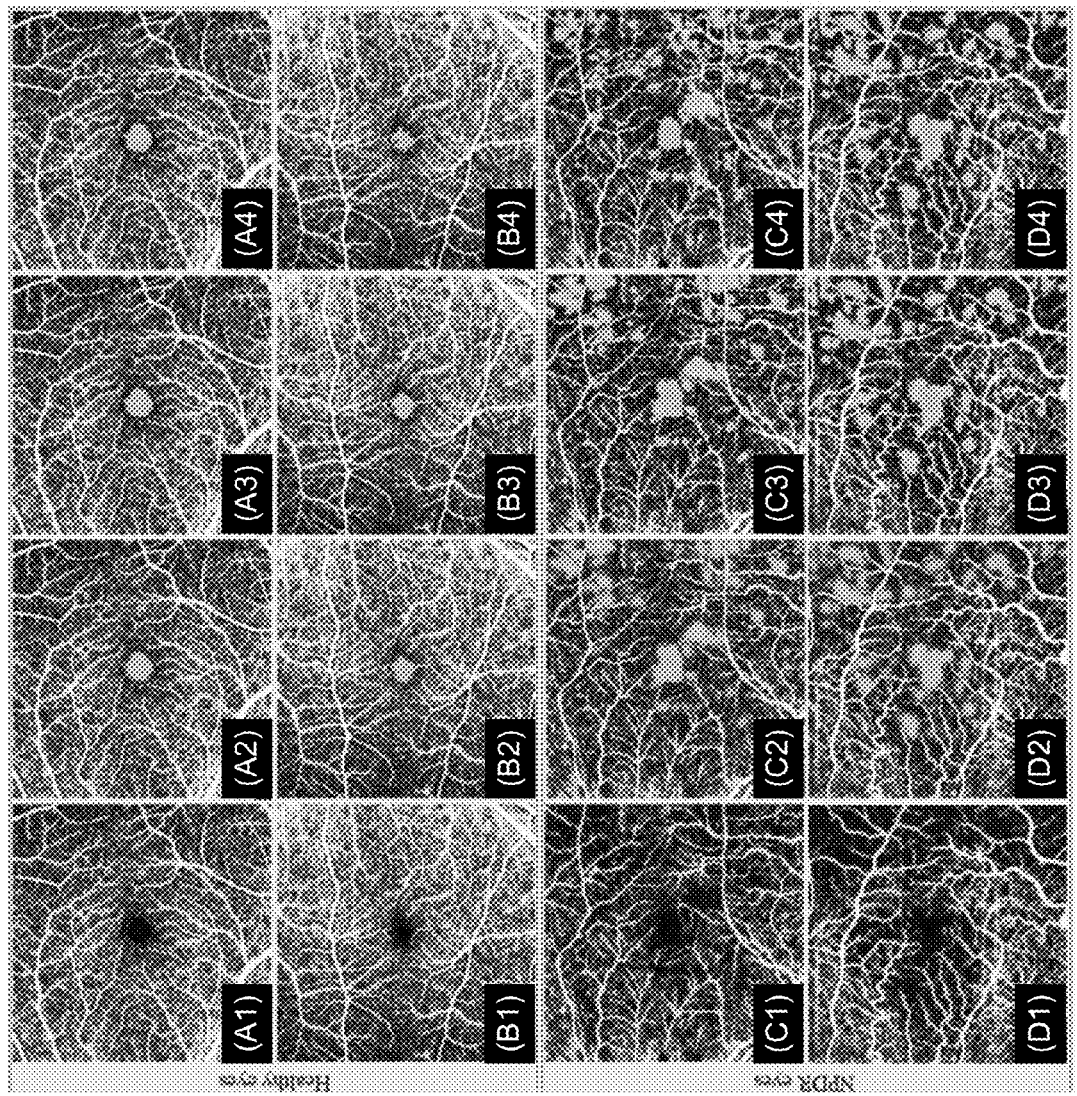
FIG. 15 illustrates results of the avascular area detection.

The avascular area in the healthy controls is concentrated in the macular area (FIGS. 15(A4) and 15(B4))), while in the DR groups, there are more avascular areas outside the Foveal Avascular Zone (FAZ) and randomly distributed over the SVC angiograms (FIGS. 15(C4) and 15(D4)). Therefore, the cumulative classification error on the severe DR group was larger than for healthy controls, as it was more likely to exhibit mismatch with the subjective manual segmentation (Table 4). With regards to data with different signal strengths, the method described with reference to this example could achieve good accuracy for all scans within the range of SSI values recommended by the manufacturer (SSI>55) but better accuracy for high quality scans (Table 4). This may be due to low quality scans having a larger prevalence of artifacts causing artificially high OCTA signal (such as in motion artifacts) or signal loss due to pupil vignetting (FIGS. 15(D2) and 15(D3)). Moreover, the low-quality scans exhibited deteriorated vascular integrity and might have biased the classification towards larger avascular areas.

3.4 Performance on Wide Field of View OCTA

In a disease like DR it is useful to gain access to the largest available field of view (FOV). Although the FOV of a single OCTA scan is limited by hardware capabilities, software registration and stitching of images acquired in different retinal locations can assist to generate ultra-wide FOV OCTA. For this purpose, a DR subject was imaged on the optic disc, macula, and temporal retina using a wide-field OCTA prototype housed at the Center for ophthalmic optics and lasers of Oregon Health and Science University and reported previously. Liu et al J. BIOPHOTONICS 10(11), 1464-72 (2017).

TABLE 4

Agreement (in pixels) between MEDnet and Ground Truth of the Avascular Area (mean ± standard deviation)

| | | Accuracy | Precision | Recall | F1-score | Detected Avascular area (mm$^2$) |
|---|---|---|---|---|---|---|
| Disease | Control | 0.89 ± 0.04 | 0.84 ± 0.05 | 1.00 ± 0.00 | 0.91 ± 0.03 | 0.37 ± 0.18 |
| | Diabetes without retinopathy | 0.79 ± 0.11 | 0.77 ± 0.11 | 0.99 ± 0.00 | 0.87 ± 0.07 | 0.69 ± 0.59 |
| | Mild to moderate NPDR | 0.87 ± 0.07 | 0.85 ± 0.09 | 0.99 ± 0.00 | 0.91 ± 0.05 | 1.08 ± 0.69 |
| | Severe DR | 0.76 ± 0.06 | 0.68 ± 0.06 | 1.00 ± 0.00 | 0.81 ± 0.04 | 2.03 ± 1.11 |
| SSI | 55-61 | 0.76 ± 0.09 | 0.75 ± 0.07 | 1.00 ± 0.00 | 0.85 ± 0.06 | 2.84 ± 1.88 |
| | 61-66 | 0.77 ± 0.11 | 0.75 ± 0.14 | 1.00 ± 0.01 | 0.85 ± 0.08 | 1.90 ± 1.27 |
| | 66-71 | 0.86 ± 0.06 | 0.83 ± 0.08 | 0.99 ± 0.01 | 0.90 ± 0.05 | 1.12 ± 0.94 |
| | >71 | 0.85 ± 0.05 | 0.80 ± 0.07 | 0.99 ± 0.00 | 0.89 ± 0.04 | 0.65 ± 0.60 |

FIG. 15 illustrates results of the avascular area detection. Rows A-B of FIG. 15 illustrate images of healthy eyes. Rows C-D of FIG. 15 illustrate images of eyes with NPDR. FIGS. 15(A1), 15(B1), 15(C1), and 15(D1) illustrate en face Superficial Vascular Complex (SVC) angiograms of healthy and Non-Proliferative Diabetic Retinopathy (NPDR) subjects. FIGS. 15(A2), 15(B2), 15(C2), and 15(D2) illustrate probability maps of the avascular areas generated by MEDnet overlaid on the en face angiograms. FIGS. 15(A3), 15(B3), 15(C3), and 15(D3) illustrate regions detected as avascular areas overlaid on the en face angiograms. FIGS.

Figure 16B:

FIG. 16A illustrates an ultra-wide field OCTA of an eye with diabetic retinopathy obtained by montaging three 8×10 mm$^2$ wide field OCTA en face angiograms of the Superficial Vascular Complex (SVC). FIG. 16B illustrates a vascular area detected on the eye represented in FIG. 16A overlaid on the en face angiogram of the SVC.

For wide-field OCTA, 800 OCT B-scans were acquired at 400 positions over an area of 8×10 mm$^2$ (vertical priority) and the SSADA algorithm was used to generate the angiograms. Detection of the avascular area was applied on the 8×10 mm$^2$ images and they were later rigidly montaged to represent an area of 20×10 mm² (FIGS. 16A and 16B). The network was able to detect the avascular area apparent to a human grader—despite the large prevalence of noise and without having been trained for images from this OCT instrument—over a considerably larger FOV.

4. Discussion

In this example, a deep convolutional neural network named MEDnet was designed and tested for automated quantification of retinal non-perfusion in DR using OCTA in 6×6 mm² macular angiograms of the SVC. The network uses a multi-scale block with atrous convolutions to enhance the multi-scale feature extraction capabilities and across-layer connections to preserve lateral resolution. See Chen et al., IEEE TRANS. PATTERN ANAL. MACH. INTELL. 40(4), 834-48 (2018) & Chen et al., CoRR abs/1706.05587 (2017). The features of retinal vasculature in OCTA en face images are very complex and difficult to describe using traditional computer vision methods. However, deep convolutional networks have strong feature representation capabilities. Prentašic et al. had used deep learning based method to successfully segment the foveal microvasculature on OCTA en face images. Prentašic et al., J. BIOMED. OPT. 21(7), 75008 (2016). In this work, MEDnet proved deep learning can generalize well to the complex vasculature of OCTA images and accurately localize the regions with loss of perfusion.

The experimental results indicated that MEDnet has good performance (F1-score>80%) for scans of different disease severity and image quality. Although the performance is satisfying, it should be interpreted with care, as the manual segmentation is done using subjective criteria. The threshold probability that is used to determine whether an intervascular space is an avascular area can be arbitrarily set (e.g., at 50%). Moreover, owing to the complexity of retinal angiograms and the amount of detail available, expert graders are unlikely to segment the whole extent of the avascular area. For this reason, the area calculated by the network can be larger than the area delineated manually.

5. Conclusions

In summary, we have reported a deep learning solution for the segmentation of avascular areas in the retina of DR eyes using OCTA. The network could classify pixels with confidence owing to access to multi-scale context and preservation of the lateral resolution. The inclusion of atrous convolutions with different dilations allowed it to generate features with different receptive fields without increasing the computational load. Consequently, the multi-scale feature maps offered more accurate decision making in the classification process, despite the prevalence of noise in avascular areas. Moreover, the excellent performance on ultra-wide field OCTA highlights the potential clinical applications of this deep learning configuration for the early detection and progression assessment of DR.

Conclusion

The environments and individual elements described herein may of course include many other logical, programmatic, and physical components, of which those shown in the accompanying figures are merely examples that are related to the discussion herein.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

As will be understood by one of ordinary skill in the art, each embodiment disclosed herein can comprise, consist essentially of or consist of its particular stated element, step, ingredient or component. Thus, the terms "include" or "including" should be interpreted to recite: "comprise, consist of, or consist essentially of." The transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiments. A material effect may occur when an avascular area generated by a trained neural network differs from a manually segmented avascular area by over 20%.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventors expect skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents, printed publications, journal articles and other written text throughout this specification (referenced materials herein). Each of the referenced materials are individually incorporated herein by reference in their entirety for their referenced teaching.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

Explicit definitions and explanations used in the present disclosure are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary, 3rd Edition or a dictionary known to those of ordinary skill in the art, such as the Oxford Dictionary of Biochemistry and Molecular Biology (Ed. Anthony Smith, Oxford University Press, Oxford, 2004).

What is claimed is:

1. A system, comprising:
    an output device;
    at least one processor; and
    memory storing:
        a convolutional neural network (CNN) comprising a multi-scale block, a merge block, at least one encoder block, and at least one decoder block; and
        instructions that, when executed by the at least one processor, cause the system to perform operations comprising:
            generating, using at least one first convolution layer in the multi-scale block, a first output image by cross-correlating at least one first filter with at least one input image using a first dilation rate, the at least one input image comprising an optical coherence tomography (OCT) reflectance image depicting a superficial vascular complex (SVC) of a retina and an optical coherence tomography angiography (OCTA) image depicting the SVC;
            generating, using at least one second convolution layer in the multi-scale block, a second output image by cross-correlating at least one second filter with the at least one input image using a second dilation rate, the first dilation rate being different than the second dilation rate;
            generating, using the merge block, a merged image by concatenating the first output image and the second output image;
            generating, using the at least one encoder block, at least one third output image by cross-correlating at least one third filter with the merged image;
            generating, using the at least one decoder block, an avascular map by cross-correlating at least one fourth filter with the at least one third output image, the avascular map indicating at least one avascular area of the SVC; and
            causing the output device to display the OCTA image overlaid with the avascular map.

2. The system of claim 1, further comprising:
    an imaging device configured to obtain a plurality of B-scans of the retina,
    wherein the operations further comprise:
    identifying a slab in the plurality of B-scans corresponding to the SVC by identifying a first boundary between a vitreous and an internal limiting membrane (ILM) of the retina depicted in the plurality of B-scans and a second boundary between a superficial vascular complex (SVC) and a deep vascular complex (DVC) of the retina based on the plurality of B-scans, the slab being defined between the first boundary and the second boundary;
    generating the OCT reflectance image by calculating a mean projection of the slab; and
    generating the OCTA image by calculating a maximum projection of the slab.

3. The system of claim 1, wherein generating the avascular map comprises:
    generating a second merged image by concatenating, using a first decoder block among the one or more decoder blocks, a fourth output image and a fifth output image among the one or more third output images, the fourth output image being output by a first encoder block among the one or more encoder blocks, the fourth output image being output by a second encoder block among the one or more encoder blocks;

generating, using the first decoder block, a sixth output image by cross-correlating the second merged image with a fifth filter among the one or more fourth filters; and generating the avascular map based on the sixth output image.

4. A method comprising:

generating, using a multi-scale block of a convolutional neural network (CNN), a first output image based on an optical coherence tomography (OCT) reflectance image of a retina and an OCT angiography (OCTA) image of the retina;

generating, using an encoder of the CNN, at least one second output image based on the first output image;

generating, using a decoder of the CNN, a third output image based on the at least one second output image; and generating an avascular map based on the third output image, the avascular map indicating at least one avascular area of the retina depicted in the OCTA image.

5. The method of claim 4, wherein generating the first output image comprises:

generating fourth output images by convolving or cross-correlating the OCT reflectance image and the OCTA image with filters using different dilation rates; and generating the first output image by concatenating the fourth output images.

6. The method of claim 4, the at least one second output image comprising multiple output images, wherein generating the third output image comprises:

generating a merged image by merging two of the second output images; and generating the third output image by convolving or cross-correlating the merged image with at least one filter.

7. The method of claim 4, wherein generating the avascular map comprises convolving or cross-correlating the third output image with at least one filter.

8. The method of claim 4, wherein the OCT reflectance image and the OCTA image depict an area of the retina that is at least 3×3 mm2.

9. The method of claim 4, further comprising:

identifying a plurality of B-scans of the retina;

identifying a first boundary between a vitreous and an internal limiting membrane (ILM) of the retina depicted in the plurality of B-scans;

identifying a second boundary between an internal limiting membrane (ILM) and a superficial vascular complex (SVC) of the retina depicted in the plurality of B-scans;

identifying a slab in the B-scans between the first boundary and the second boundary;

generating the OCT reflectance image based on the slab; and generating the OCTA image based on the slab.

10. The method of claim 9, wherein generating the OCT reflectance image comprises calculating a mean projection of the slab.

11. The method of claim 9, wherein generating the OCTA image comprises at least one of calculating a maximum projection of the slab or a mean projection of the slab.

12. The method of claim 4, further comprising:

displaying, on an output device, the OCTA image overlaid with the avascular map, the at least one avascular area of the SVC being indicated by a first color that is different than a second color in the OCTA image.

13. A system comprising:

at least one processor; and memory storing:

a convolutional neural network (CNN) comprising filters;

instructions that, when executed by the at least one processor, cause the system to perform operations comprising:

identifying optical coherence tomography (OCT) reflectance images depicting retinas;

identifying OCTA images depicting the retinas;

generating, using the CNN, estimated avascular maps indicating avascular areas of the retinas based on the OCT reflectance images and the OCTA images; and optimizing parameters of the filters by minimizing a loss between the estimated avascular maps and ground truth avascular maps indicating avascular areas of the retinas.

14. The system of claim 13, wherein the retinas comprise at least one healthy retina, at least one retina exhibiting diabetic retinopathy (DR), and at least one retina developing DR.

15. The system of claim 13, wherein optimizing the parameters of the filters comprises using an optimizer with an exponential decay learning rate to minimize the loss.

16. The system of claim 13, wherein the operations further comprise:

generating a ground truth map among the ground truth maps by:

receiving a first indication that a first pixel of an OCTA image among the OCTA images indicates a vascular area, the first indication corresponding to a first assessment by a first expert;

receiving a second indication that the first pixel indicates an avascular area, the second indication corresponding to a second assessment by a second expert;

receiving a third indication that the first pixel indicates the avascular area, the third indication corresponding to a third assessment by a third expert;

determining that the pixel indicates the avascular area based on the first indication, the second indication, and the third indication; and defining a second pixel of the ground truth map as indicating an avascular area, the second pixel of the ground truth map corresponding to the first pixel of the OCTA image.

17. The system of claim 13, wherein generating the estimated avascular maps comprises:

cross-correlating or convolving the filters with the OCT reflectance images and the OCTA images.

18. The system of claim 13, wherein the OCT reflectance images and the OCTA images depict areas of the retinas that are at least 3×3 mm2.

19. The system of claim 13, wherein the filters comprise at least one 3×3 pixel filter.

20. The system of claim 13, wherein the CNN comprises:
- a multi-scale block comprising a first set of the filters, the third set of the filters comprising atrous filters configured to apply multiple dilation rates;
- an encoder comprising a second set of the filters; and
- a decoder comprising a third set of the filters.

* * * * *